US010412466B2

(12) United States Patent
Allen et al.

(10) Patent No.: US 10,412,466 B2
(45) Date of Patent: Sep. 10, 2019

(54) NETWORKS, SYSTEMS AND METHODS FOR ENHANCED AUTO RACING

(71) Applicant: Pit Rho Corporation, Littleton, CO (US)

(72) Inventors: Erik Allen, Minneapolis, MN (US); Kyle Jensen, New Haven, CT (US); Gilman Callsen, Charlottesville, VA (US); Joshua Browne, New York, NY (US); Kevin Schaff, Littleton, CO (US); Paul Harraka, Wayne, NJ (US); Joel Moxley, Littleton, CO (US)

(73) Assignee: PIT RHO, Highlands Ranch, CO (US)

( * ) Notice: Subject to any disclaimer, the term of this patent is extended or adjusted under 35 U.S.C. 154(b) by 577 days.

(21) Appl. No.: 14/192,839

(22) Filed: Feb. 27, 2014

(65) Prior Publication Data

US 2014/0331253 A1 Nov. 6, 2014

Related U.S. Application Data

(60) Provisional application No. 61/770,872, filed on Feb. 28, 2013.

(51) Int. Cl.
*H04N 21/81* (2011.01)
*H04N 21/235* (2011.01)
(Continued)

(52) U.S. Cl.
CPC ....... *H04N 21/8126* (2013.01); *G06F 3/1423* (2013.01); *H04N 21/2353* (2013.01);
(Continued)

(58) Field of Classification Search
CPC ............. H04N 21/23; H04N 21/8456; H04N 21/8133; H04N 21/472; H04N 21/2668; H04N 21/454; H04N 21/4781
(Continued)

(56) References Cited

U.S. PATENT DOCUMENTS

| 8,253,799 B2 | 8/2012 | Elangovan |
| 2001/0042105 A1* | 11/2001 | Koehler ................. H04H 20/04 709/217 |

(Continued)

FOREIGN PATENT DOCUMENTS

| WO | WO 2007/0631346 A1 * | 5/2007 |
| WO | WO2007061346 | 5/2007 |

OTHER PUBLICATIONS

International Search Report and the Written Opinion of the International Searching Authority, PCT/US2014/019164, dated Jun. 23, 2014.

*Primary Examiner* — Omar S Parra
(74) *Attorney, Agent, or Firm* — Glen P. Belvis; Belvis Law, LLC.

(57) ABSTRACT

Networks, systems and displays for providing derived data and predictive information for use in multivariable component systems and activities; and in particular for use in motor racing such as in NASCAR®, Indy Car, Grand-Am (sports car racing), and/or Formula 1® racing. More particularly, there are systems equipment and networks for the monitoring and collecting of raw data regarding races, both real time and historic. This raw data is then analyzed to provide derived data, predictive data, virtual data, and combinations and variations of this data, which depending upon the nature of this data may be packaged, distributed, displayed and used in various setting and applications.

60 Claims, 21 Drawing Sheets

(51) Int. Cl.
  *H04N 21/478*  (2011.01)
  *H04N 21/84*  (2011.01)
  *G06F 3/14*  (2006.01)
  *G07C 1/24*  (2006.01)

(52) U.S. Cl.
  CPC .......... *H04N 21/478* (2013.01); *H04N 21/84* (2013.01); *G07C 1/24* (2013.01); *G09G 2370/022* (2013.01)

(58) Field of Classification Search
  USPC ... 725/32, 36, 146, 144, 116, 95, 61, 25, 34, 725/114; 463/6; 455/457; 386/241; 345/629, 619, 158; 709/217
  See application file for complete search history.

(56) References Cited

U.S. PATENT DOCUMENTS

| | | | |
|---|---|---|---|
| 2002/0115454 A1* | 8/2002 | Hardacker | 455/457 |
| 2004/0266506 A1* | 12/2004 | Herbrich et al. | 463/6 |
| 2008/0186330 A1* | 8/2008 | Pendleton et al. | 345/619 |
| 2009/0262137 A1* | 10/2009 | Walker et al. | 345/629 |
| 2012/0087637 A1* | 4/2012 | Logan et al. | 386/241 |
| 2012/0249424 A1* | 10/2012 | Bove et al. | 345/158 |
| 2014/0058992 A1* | 2/2014 | Lucey | G06N 5/043 706/46 |

\* cited by examiner

| At lap n = 100 | | |
|---|---|---|
| J.J. | actual lap time | 27.54 sec. |
| K.K. | actual lap time | 27.68 sec. |
| delt on track | | 1.74 sec. |
| | field avg. | 28 sec. |

| Predicted time to Lap 150 | | |
|---|---|---|
| | seconds | seconds |
| J.J. | | 1395 |
| K.K. | | 1389 |
| delta s J.J. - K.K. | | -6 |

Power Ranking Projection Algorithm

- Finish Position described by the Beta-Binomial Distribution $$f(k|n, \alpha, \beta) = \frac{\Gamma(n+1)}{\Gamma(k+1)\Gamma(n-k+1)} \frac{\Gamma(k+\alpha)\Gamma(n-k-\beta)}{\Gamma(n-\alpha-\beta)} \frac{\Gamma(\alpha+\beta)}{\Gamma(\alpha)\Gamma(\beta)}$$

- Team Finish Position automatically updated based on results of most recent race $$\alpha_{post} = \alpha_{pre} + \gamma\left(\frac{k}{n}\right) \quad \beta_{post} = \beta_{pre} + \gamma\left(\frac{n-k}{n}\right)$$

$$\mu_{post} = \frac{\alpha_{post}}{\alpha_{post} + \beta_{post}} \quad \sigma_{post} = \sqrt{\frac{\alpha_{post}\beta_{post}}{(\alpha_{post} + \beta_{post})^2(\alpha_{post} + \beta_{post} + 1)}}$$

$$\mu_{next} = \mu_{post} \quad \sigma_{next} = \sqrt{\sigma^2 + \delta^2}$$

$$\alpha_{next} = \mu_{next}\left(\frac{\mu_{next}(1-\mu_{next})}{\sigma_{next}\sigma_{next}} - 1\right) \quad \beta_{next} = (1-\mu_{next})\left(\frac{\mu_{next}(1-\mu_{next})}{\sigma_{next}\sigma_{next}} - 1\right)$$

FIG. 10C

NETWORKS, SYSTEMS AND METHODS FOR ENHANCED AUTO RACING

This application claims the benefit of priority of provisional application Ser. No. 61/770,872 filed Feb. 28, 2013, the entire disclosure of which is incorporated herein by reference.

BACKGROUND OF THE INVENTION

Field of the Invention

The present inventions relate to networks, systems and the providing of derived data for use in multivariable component systems and activities.

As used herein, unless specified otherwise, the terms multivariable component system, multivariable component activities, multivariable components and similar such terms are to be given their broadest possible meanings, and would include, for example, the flow of motorized vehicle traffic in a traffic pattern or highway system, the movement of shipping containers in the global shipping industry or for a particular shipping company, the movement of packages in a shipping company's system, and the movement and position of motorized vehicles in a race, such as the movement and position of closed and open wheel race cars in an automobile race, such as a NASCAR® and/or Formula 1® sanctioned racing event, as well as motorcycle racing, such as MotoGP. Non-motorized racing, such as bicycle racing, e.g., the Tour de France, is a further example of a multi-variable component system.

In motorized vehicle racing, and, for example, in particular in automobile racing such as in NASCAR® Indy Car, Grand-Am (sports car racing) or Formula 1® racing, there are highly complex and unpredictable multi-variable, multi-actor events that can take place in a race. Events and variables, such as full course cautions, pit box position (e.g., the position in pit row assigned to a team for a particular race), pit stop strategy, pit crew performance, tire wear variations, mechanical conditions, weather conditions, the "free pass" rule, and the wave around rule make determining and predicting shorter term events, e.g., car position change over the next few laps, and longer term events (e.g., lead change over 50 laps, the race outcome, the race result, and the race winner) very difficult, if not impossible to determine and predict. This failing by those of skill in the art of motor racing to determine and predict shorter term and longer term race standings, trends and conditions exists in spite of the fact, and perhaps because of the fact, that a large amount of real time raw data and historic raw data is available about the race and the drivers, conditions, cars, owners, crew chiefs and teams that are competing in the race. This data can be obtained from NASCAR® as well as potentially from Indy Car, Grand-Am (sports car racing) and Formula 1®, individual racing teams, ESPN®, Sportvision®, Stats Inc®, and wide variety of others.

This large stream, or amount, of raw data provides little or no determinative information or predictive value. Often the fastest car in a NASCAR® does not win that race. Further, and in general, the trend in the art of motor racing has been to provide more and more data, and to present this data in fancier packaging, images and graphics, such as shown in U.S. Pat. No. 8,253,799. While this more visually stimulating presentation of raw data may be entertaining to some; its large volume may be confusing to others. Thus, in spite of the direction of the art of motor racing to providing larger and larger amounts of raw data, and to do so in more visually stimulating ways, there exists a long felt and unmet need for determinative information of predictive value in motor racing.

This long felt and unmet need is exacerbated further by the rapidly increasing channels and access that fans, media, fantasy sports participants, and race teams have through a "Second Screen" using mobile devices, laptops, iPads, and other portable data interfaces. These devices are often unified by their ability to process data and structure and present content in the core internet technology of HTML5, whereas previous generation displays could be fragmented with heavier, less responsive, and generally more clunky platforms for rich data display such as Adobe Flash. These portable data interfaces present an even larger challenge to reducing the clutter, confusion, and general data overload to a user because often value-added data must be presented in more constrained visual real estate such as a mobile device screen and other portable data interface screens.

Furthermore, the clutter, confusion, and general data overload to a user can generally obscure desired user engagement mechanisms such as fantasy sports where typically a participant cannot easily determine their standing in real-time relative to other participants in a league. Thus, no mechanism exists to create virtual races for the purpose of, by way of example, virtually entering historical drivers (e.g., Dale Earnhardt Sr) into a race, creating head-to-head races for fantasy racing leagues in parallel with an actual race, virtually creating the ability for users to enter their own virtual cars in a race with the ability to make their own strategy and crew chief decisions, and more generally create other virtual experiences that drive engagement and offer novel advertising units.

As used herein, unless specified otherwise, the terms actual data, actual information, raw data, raw information, and similar such terms are to be given their broadest possible meaning and would include information obtained from direct and indirect observation, monitoring, measuring, sensing and combinations and variations of these. Actual data would include, for example: global positioning satellite (gps) data, which would include for example information regarding speed, location and direction; data from a position determining system such as from a series of transponders and receivers, which would include for example information regarding speed, location and direction; optical information such as by camera, video camera, image recognition systems including for example from a system such as that disclosed in U.S. Pat. No. 8,253,799 the entire disclosure of which is incorporated herein by reference, optical switches including optical beam timing switches, laser radar, laser range finding and laser tracking; magnetic sensors such as those which may be embedded in a road surface; sensor, probe and monitor data sources, such as temperature, speed, rpm, acceleration (longitudinal, lateral, and gyroscopic), operator physical parameters (e.g., heart rate, pulse, respiration, g-force to the head or other body part), tire pressure, tire temperature, fuel used, fuel remaining, speed, oil pressure, rpm, weight, load, driver inputs (throttle position, steering position, brake pressure), chassis performance measurements (lateral/vertical/longitudinal accelerations, suspension displacements) etc.; visual data, such as a race car crossing the finish line; telemetry, such as when sensor, probe and monitor data is transmitted to a receiver; radar measurement and monitoring systems; and logged on-board vehicle data that is stored and downloaded after the race event. Actual data and information may be provided, received or obtained real-time, it may be provided, received or obtain as historic data or stored actual information from a prior event, and combinations and variation of these. Actual data and information may be in compilations of data, which may further be sorted, indexed, tagged or otherwise categorized.

As used herein, unless specified otherwise, the terms derived data, derived information and similar such terms are to be given their broadest possible meaning and would include raw data upon which a calculation or operation has been performed. For example, if fuel consumption rate, e.g., gallons used per hour, is calculated by performing the operation of obtaining raw data for the amount of fuel present $f_1$, and $f_2$ at time $t_1$ and $t_2$; then calculating the amount of fuel used over time interval $t_2-t_1$, the resultant value, e.g., gals/hour, would be an example of derived data. Alternatively, if a flow sensor is installed on the fuel tank that directly measures the amount of fuel flowing from the fuel tank, the data from that flow sensor would be actual data, not derived data. Accordingly, values such as averages are considered derived data, because they are derived from one or more operations on raw data. Although examples of simple (one, two or three) operations are provided above, it should be understood that tens, hundreds, thousands, and hundreds of thousands of operations or calculation, or more, may be performed on data to obtain derived data.

When derived data is stored, it becomes historic data, but also remains derived data, i.e., historic derived data. Derived data can be subjected to operations and calculations with the resulting information being derived data. Further, derived data, for example from real time raw race data, can be combined with historic data, raw or derived, e.g., how racer "X" perform under similar track conditions, and used in operations and calculations to render additional derived data.

Derived data, from real time raw data, from historic data, and from combinations and variations of these, may be determinative information of predictive value to a multivariable component system, and in particular predictive value to a race, such as a NASCAR® and/or Formula 1® race.

As used herein, unless specified otherwise, the terms predictive data, predictive information, determinative information and determinative data are to be given there broadest possible meanings and would include derived data and information that provides, for example, information about trends, in formation leading to future outcome, future events, predicted events, trends leading to further events, normalized real time performance as an indicator of future actions or events, and similar mathematically derived and predictive values that are, or are at least in part based upon, derived data. Predictive data and information would include derived data in the form of probabilities of likely outcome, windows of likely outcome and similar types of values. Predictive data may be micro in nature, macro in nature, cumulative in nature, and combinations and variations of these. Thus, using a NASCAR® and/or Formula 1® race by way of example, predicting that racer "X" will pit in the next 5 laps, but only take 2 tires would be predictive information that is micro in nature. Using this micro predictive information with other predictive information, derived data, and raw data to predict that racer "X" will advance 3 positions and overtake racer "Y" in the next 15 laps would be an example of predictive information that is macro in nature. Predictive information about the winner of a race would be a further example of predictive information that is macro in nature.

As used herein, unless specified otherwise, the terms virtual data, virtual entity and similar such terms are to be given their broadest possible meaning and would include any types of data that are generated from, capture, result from, or relate to virtual activities. Thus, for example, if raw data, derived data and predictive data are used to conduct a virtual or fantasy race, the information and data regarding that virtual race would be considered virtual data and information. Thus, it can be seen that there may be historic virtual data (e.g., last weeks fantasy race) and real time virtual data (e.g., the fantasy race that is being played out real time). There may also be raw virtual data, derived virtual data, and predictive virtual data. Essentially, it is contemplated that all of the data, computations and predictions from the real world, may be used in a similar manner in a fantasy or virtual world.

As used herein, unless specified otherwise, node, communication node, point on a network, communication point, data point, network address and similar such terms are to be given their broadest possible meanings, and would include for example, sensors, processors, data receiving assemblies, data transmitting assemblies, data receiving/processing/transmitting assemblies, GUI, satellite dishes, cable boxes, transmitters, TVs, computers, gaming stations, gps transmitters, cellular devices, cellular phones, tablets, iPhones®, iPad®, I/O devices, and data storage devices. A node may also be a structure or location where other nodes may be present, for example a sports bar, where TVs are present will also have the hand held cellular devices that its patrons bring in with them.

As used herein, unless specified otherwise, the term GUI, graphic user interface, is to be given its broadest possible meaning and would include for example devices that are fully interactive, partially interactive and not interactive, it would include all types of displays and monitors (both with and without keyboards), it would include touch screen monitors and even heads up displays and Google Glass. Braille devices, and other device for assisting in and communicating with the visually impaired, are considered herein to be a GUI.

As used herein, unless specified otherwise, the terms network, network pathway, pathway and similar terms are to be given there broadest meaning and would include any wires, optical, wireless, fibers, light waves, magnetic wave, or other medium over which data can be transmitted, combinations of various types of different types of these mediums, which would include for example, satellite broadcasts, conventional television signals, cable networks, telephone networks, DSL networks, the internet, the world wide web, intranets, private networks, local networks, cellular, Ethernet, node to node links, radio, telegraph, power lines, and other presently known or later developed technologies for transmitting, receiving and/or sharing data and information.

SUMMARY

There has been a long standing need for enhanced systems, networks and methods that can provide derived data, predictive data, virtual data and combinations and variations of these, for multivariable component systems, such as a motorsports race and in particular for NASCAR® and/or Formula 1® races. This long standing and unmet need is believed to be present across all aspects of the race, including for example: crew chiefs in determining real time race strategy; racing teams in reviewing past races to improve racing strategies; safety; car and team owners in determining the best fit of team members and equipment; equipment suppliers such as tire manufactures; spectators and fans in watching, experiencing and analyzing the race real time; fans and spectator in sharing and networking their experience, derived and predictive data and analysis, and opinions; fans and spectators in watching, experiencing and analyzing historic races; NASCAR® and/or Formula 1® in evaluating rule changes and policies to make the race safer, more entertaining and more competitive; and fantasy sports fans, fantasy sport hosts and providers and fantasy sports participants, to name a few. The present inventions meet these and other needs.

Thus, there is provided a determinative system for obtaining, evaluating and displaying in a predictive manner, information and data regarding the activities of units in a multivariable component system, the determinative system including: a source of raw data regarding activities of a first plurality of units of a multivariable component system; a source of derived data regarding activities of a second plurality of units of the multivariable component system; wherein, at least one unit of the first plurality of units is the same as a unit of the second plurality of units; a processor in communication with the source of derived data and the source of raw data; the processor capable of performing a first predictive computation to determine a change of state event in the multivariable component system from the raw data and the derived data; and, whereby the processor determines predictive information comprising a probability for the change of state event, and wherein the processor communicates the predictive information to a display.

Further there is provided a determinative system for obtaining, evaluating and displaying in a predictive manner, information and data regarding the activities of units in a virtual multivariable component system, the determinative system having: a source of virtual raw data regarding activities of a first plurality of units of a multivariable component system; a source of virtual derived data regarding activities of a second plurality of units of the multivariable component system; wherein, at least one unit of the first plurality of units is the same as a unit of the second plurality of units; a processor in communication with the source of virtual derived data and the source of virtual raw data; the processor capable of performing a first predictive computation to determine a change of state event in the virtual multivariable component system from the virtual raw data and the virtual derived data; and, whereby the processor determines predictive information comprising a probability for the change of state event, and wherein the processor communicates the predictive information to a display.

Yet further there is provided the methods and systems having one or more of the following features, including: wherein the multivariable component system comprises a NASCAR sanctioned event; wherein at least one unit of the first plurality of units is a race car driven by at least one of the drivers selected from the group consisting of Jimmie Johnson, Dale Earnhardt Jr., Mark Martin, Brad Keselowski, Ryan Newman, Greg Biffle, Danica Patrick, Michael McDowell, Jeff Gordon, and Paul Menard; wherein the processor is capable of performing a second predictive computation to determine the change of state event in the multivariable component system from the raw data and the derived data; whereby the processor determines predictive information comprising a probability for the change of state event based in part on the first and second predictive computation, and wherein, the processer transmits the predictive information to a display; wherein at least 5 of the units in the first plurality units are the same as the units in the second plurality of units; wherein the display is a Second Screen; wherein the display is a commercial media broadcast; where wherein the display is a hand held device; wherein the display has an imagine comprising a image of a race car with the predictive information displayed in association with the race care image; wherein the display has an imagine comprising a image of a race car with the predictive information displayed in association with the race care image, wherein the predictive information is displayed in a Second Screen; wherein the processor is capable of performing a second predictive computation to determine the change of state event in the multivariable component system from the raw data and the derived data; whereby the processor determines predictive information comprising a probability for the change of state event based in part on the first and second predictive computation, and wherein, the processer transmits the predictive information to a display; wherein the multivariable component system comprises a Formula 1 event; wherein the multivariable component system comprises a Indy Car event; wherein the multivariable component system comprises a motorized vehicle race; wherein the multivariable component system comprises a race; and wherein the multivariable component system comprises a stock car race.

Moreover there is provided a system having a first and a second processors and a local data entry device for providing observed data, wherein the second processor is in communication with the local data entry device and in communication with the processor, whereby the second processor is capable of performing a first predictive computation to determine a change of state event in the multivariable component system from the observed data; and, the second processor is capable of determining predictive information comprising a probability for the change of state event, and wherein the processer communicates the predictive information to a device, selected from the group consisting of the server, a GUI, the processor, a third processor, a pit administration device, and an HMI.

Still further there is provided a system in which the a pit data administration device is located between the pit data entry device and the second server, whereby the pit data administration device is capable of controlling the transmission of observed data to the second processor.

Furthermore, there is provided a system in which a communication link to a second server is present and is providing to the second processor a timing and scoring feed data; whereby the second processor is capable of performing a first predictive computation to determine a change of state event in the multivariable component system from the observed data and the timing and scoring data.

Yet additionally, there is provided a system for obtaining, evaluating and displaying in a predictive manner, information and data regarding the activities of units in a multivariable component system, the determinative system including: a source of raw data regarding activities of a first plurality of units of a multivariable component system; a source of derived data regarding activities of a second plurality of units of the multivariable component system; wherein, at least one unit of the first plurality of units is the same as a unit of the second plurality of units; a processor in communication with the source of derived data and the source of raw data; the processor capable of performing a first predictive computation to determine a change of state event in the multivariable component system from the raw data and the derived data; and, whereby the processor determines predictive information comprising a probability for the change of state event, and wherein the processer communicates the predictive information to a display, which further has a second processors and a local data entry device for providing observed data, wherein the second processor is in communication with the local data entry device and in communication with the processor, whereby the second processor is capable of performing a first predictive computation to determine a change of state event in the multivariable component system from the observed data; and, the second processor is capable of determining predictive information comprising a probability for the change of state event, and wherein the processer communicates the predictive information to a device, selected from the group consisting of the server, a GUI, the processor, a third processor, a pit administration device, and an HMI.

Additionally, there is provided the methods and systems having one or more of the following features, including: a pit data administration device located between the pit data entry device and the second server, whereby the pit data administration device is capable of controlling the transmission of observed data to the second processor; a communication link to the second server providing to the second processor a timing and scoring feed data; whereby the second processor is capable of performing a first predictive computation to determine a change of state event in the multivariable component system from the observed data and the timing and scoring data; a second processors and a local data entry device for providing observed data, wherein the second processor is in communication with the local data entry device and in communication with the processor, whereby the second processor is capable of performing a first predictive computation to determine a change of state event in the multivariable component system from the observed data; and, the second processor is capable of determining predictive information comprising a probability for the change of state event, and wherein the processer communicates the predictive information to a device, selected from the group consisting of the server, a GUI, the processor, a third processor, a pit administration device, and an HMI; a pit data administration device located between the pit data entry device and the second server, whereby the pit data administration device is capable of controlling the transmission of observed data to the second processor; a communication link to the second server providing to the second processor a timing and scoring feed data; whereby the second processor is capable of performing a first predictive computation to determine a change of state event in the multivariable component system from the observed data and the timing and scoring data.

Moreover, there is provided a method of providing a display of a race to a viewer, in which the method includes: providing actual race data, historic race data to a network; processing the actual and historic race data and thereby generating derived and predictive race data from the received actual race data and historic race data; transmitting the derived and predictive race data along the network; a mobile device on the network receiving the predictive race data; and, the mobile device displaying the predictive race data in a GUI.

Additionally, there is provided the methods and systems having one or more of the following features, including: wherein the mobile device displays the predictive data in preconfigured windows on the GUI, the windows being menu driven to provide predetermined displays of the predictive data; wherein the mobile device displays, predictive data, derived data and actual data, in preconfigured windows on the GUI, the windows being menu driven to provide predetermined displays of the data; a data processing assembly, residing in the cloud, whereby the data processing assembly performs the processing of the actual and historic data; wherein the derived data is processed with a second actual data to provide a second predictive data; wherein the network is a distributed network comprising a plurality of data processing assemblies, each receiving actual data and providing to the network derived and predictive data; wherein the GUI displays images of the race.

Still further there is provided a method of combining information about a race for later viewing, the method including: storing data containing a video image of the race; associating in a time synchronized manner with the video image actual, predictive and derived data; storing the associated video and data; and making the associated video and data available for viewing.

Moreover, there is provided a method of viewing a race, the method including: accessing data comprising a video image of the race associated in a time synchronized manner with actual, predictive and derived data; viewing the video of the race and at least the predictive data; and having the capability to skip forward in the viewing of the race, based at least in part upon the predictive data; whereby the viewer has the ability to create and view high lights of the race without knowing the actual outcome of the race.

BRIEF DESCRIPTION OF THE DRAWINGS

FIG. 10C is an embodiment of a predictive algorithm in accordance with the present inventions.

DESCRIPTION OF THE PREFERRED EMBODIMENTS

The present inventions relate to networks, systems and the providing of derived data and predictive information for use in multivariable component systems and activities; and in particular for use in motor racing such as in NASCAR®, Indy Car, Grand-Am (sports car racing), and/or Formula 1® racing. More particularly, the present inventions relate to systems equipment and networks for the monitoring and collecting of raw data regarding races, both real time and historic. This raw data is then analyzed to provide derived data, predictive data, virtual data, and combinations and variations of this data, which depending upon the nature of this data may be packaged, distributed, displayed and used in various setting and applications.

Figure 1:
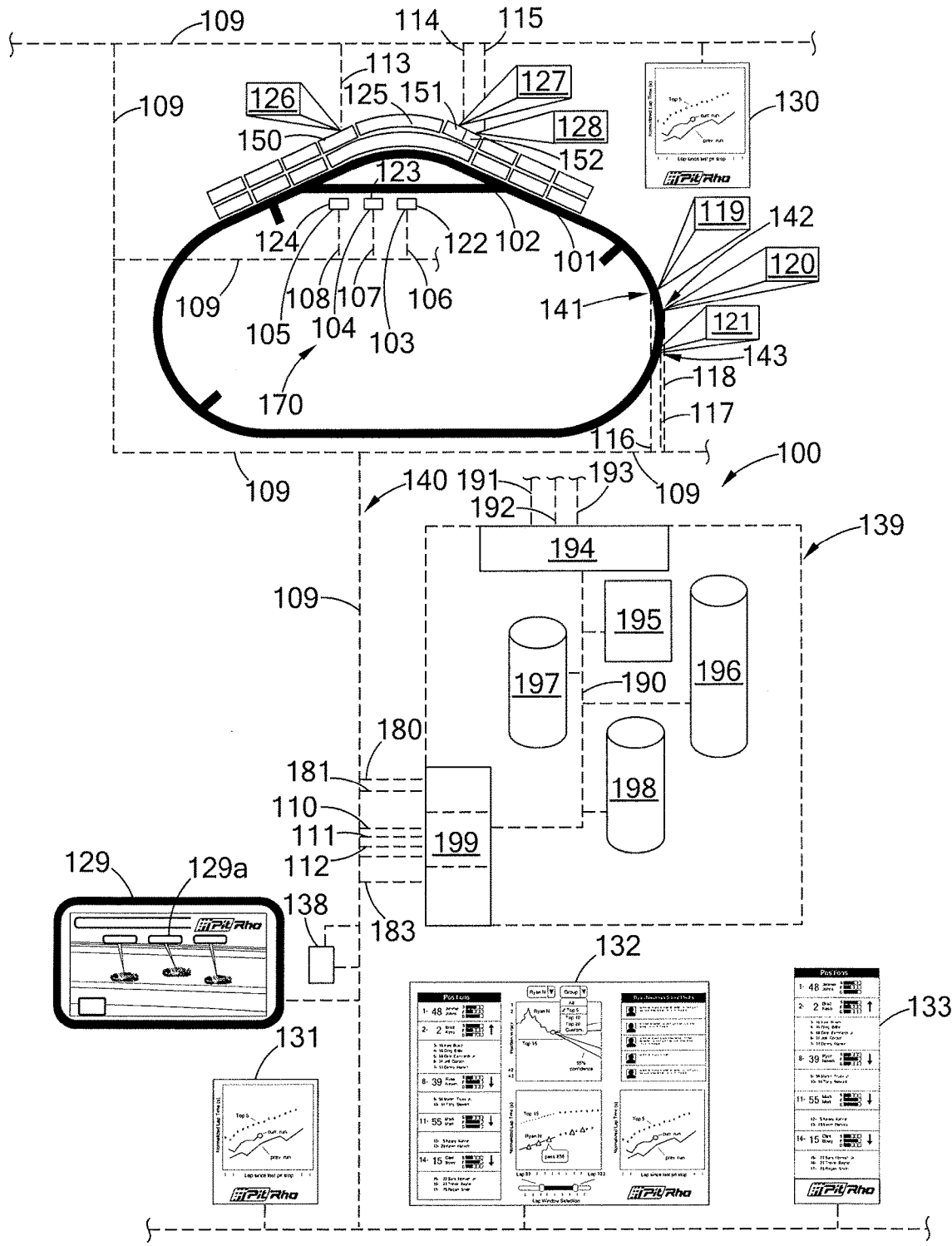
FIG. 1 is a schematic of an embodiment of a communications system in accordance with the present inventions.

Turning to FIG. 1 there is provided an embodiment of a communication system for a race. The communication system 100, has a network 140. The network 140 may be any type or combination of types of communication and data networks. Thus, for example, the network 140 can be a distributed network, a direct communication network, a control network, the internet, the world wide web, a wireless network, a cellular network, Wi-Fi network, a hard wired network, an Ethernet network, a satellite network and combinations and variations of these, and other data and information communicate equipment and process that are presently known and may become known in the future.

The race communication system 100 has several nodes or communication points, having one or more receiving device, transmitting device and combinations of these. The number and types of nodes may vary, from race to race, track to track, from team/organization to team/organization and before, during and after the race. In the embodiment of FIG. 1, the network 140 of race communication system 100 has as nodes: racetrack 101, race car number one (car one position shown by arrow 141), race car number two (car two position shown by arrow 142), race car number three (car three position shown by arrow 143), car one driver heads up display 119, car two driver heads up display 120, car three driver heads up display 121, pit row 123, car one pit box 103, car two pit box 104, car three pit box 105, pit box car one display 122, pit box car two display 123, pit box car three display 124, grandstand 125, car one master center 150 and master center display 126, car two master center 151 and master center display 127, car three master center 152 and master center display 128, data processing assembly 139, commercial broad cast network 138, television ("TV") 129, tablet display 130, smart phone display 131, computer display 132, and cellular phone display 133.

Further these nodes may be viewed as sub-nodes of a larger node. For example racetrack 101 node would include as sub-nodes all of the nodes located at the racetrack, e.g., pit row 102, which in turn has sub-nodes, e.g., pit box 144.

It being understood that for each display, e.g., 127, 122, 132, is a GUI. They may have associated keyboards, key pads, touch screens, etc.

The network 140, in the embodiment of FIG. 1, has several communication pathways. These pathways may be over the same routes, or portions of the network 140, they may share some but not all routes, they may be totally separate, and combinations and variations of these. Each route or pathway may have its own proprietary communication protocol, it may use a publically available protocol, e.g., Internet protocol 6 ("IPv6"). The communication, e.g., the data and information set over the pathway may be encrypted, protected, or otherwise encoded, such that only an intended recipient can receive it, for example a predetermined recipient, e.g., an individual who has taken the necessary steps to rightfully receive information and data from the data processing assembly 139.

The pit communication pathway 109 transmits data and information from the processing assembly 139 to the pit boxes 103, 104, 105, and their associated displays 122, 123, 124, to master centers 150, 151, 152 and their associated displays 126, 127, 128, to cars 141, 142, 143 and their associated heads up displays 119, 120, 121. Thus, for example, car one data (which may be one or more of derived data, raw data, and predictive data and preferably has all three types of data and is specifically intended for car one's team) is transmitted by processing center 139 over pathway 110 onto the network 140. This data travels along path 109 of the network 140 to the pit box node 170 where the data then travels along pathway 106 to pit box one display 122, the data also travels along pathway 116 to car one heads up display 119, and along pathway 113 to car one master center display 126.

Thus, car one has in essence its own network made up of pathways 110, 109, 106, 116 and 113. Similarly, car two has its own network made up of pathways 111, 109, 107, 117 and 114. Car three has its own network made up of pathways 112, 109, 108, 118 and 115. It being understood that the separate pathways, e.g., 110, 111, are for illustrative purposes, and that each cars network could reside on the same network, the same pathways, shared pathways, individual networks, and combinations and variations of these.

Using car one's pathway by way of example, it being understood that the other car's (cars') pathways operate in similar fashions, data can be transmitted from the processing system 139 in predetermined manner or upon receiving a request from one of the nodes on car one's network. The data is preferably made up of derived data, and more preferably derived data having predictive information. Thus, for example the pit display 122 could have normalized lap time for cars one, two and three, over a requested number of prior and future laps, and the probability of car one being overtaken by car two in that time period. This information could also be displayed on, for example, a heads up display 119, that has been associated with a driver. or the car. Additionally, the master center display 126, may contain several monitors that have a large amount of derived and predictive information. This may be analyzed and only selected items shared with the driver display 126 or the pit display 122. Additionally, direct communication between the car one network nodes may take place, e.g., chat or note, or view exchange between pit box 103 and master center 150.

Further, the car network or pathway, is on the network 140, and thus its nodes (preferably excluding the driver, for obvious safety reasons) may have the ability to, or be enable to communicate in whole or in part, with other sub-networks, or specific nodes on the network 140. For examples, a fan could win, or pay a premium to view the communication between master center and pit, and the derived information on the driver's heads up display. Similarly, a car's sponsor could have preselected predictive data packaged in the sponsor's logo, or branding. And, upon a particular event having a certain probability, send the prediction, in the sponsor's branding to all fan nodes on the network 140. Thus, for example, if processing unit 139 determines that Kyle Busch and No. 18 Mars, Inc./Interstate Batteries Toyota Camry has a 85% chance of passing the Kurt Busch No. 78 Furniture Row Chevrolet SS, in the next 10 laps, the processing unit will transmit to one, or more nodes on the network this prediction in the branding of M&Ms for Mars, Inc. This prediction could be pushed, e.g., transmitted, to computer 132. It could be sent to commercial broadcast system 138 and then displayed on TV 129, in for example car specific bubble 129*a*.

It should also be recognized that additional nodes on the car network may be present. For example, while only three cars were used in the embodiment of FIG. 1, for illustrative purpose, there could be as many as 10 cars, 20 cars, 40 cars, 43 cars, or more. Additionally, there could be as few a 1 car, for example during practice or time trials. Further, while the master center is shown at the racetrack, it or a second master center could be at a remote location, anywhere in the world. Thus, for example the manufacture of the race car, for example Toyota® could have a master center at its head quarters in Japan, having derived data and predictive data transmitted to it for all of the Toyota race cars running in that race.

In the embodiment of FIG. 1, data to the fans or spectators is sent along pathways 180 for standard derived data and content, and along path 181 for premium derived data, predictive data and content. Both of these fan data streams, sets or packets, e.g., data for fans, travels along pathway 109 of network 140. This data for fans travels along pathway 109 to a tablet, such as an iPad® of a fan who forgot their ticket and is now relegated to the parking lot of the racetrack, where raw data, derived data and predictive data are presented on display 130. Thus, in this example a portion of pathway 109 will be over the cellular network associated with the iPad®. Display 130 is interactive, thus for example, the fan can determine which drivers and cars are presented, can select the time intervals over which the predicted data targets, e.g., next 5 laps, next 10 laps, end of the race. It can look at trending derived data, such as normalized lap time. Further fan devices on the network 104 may be a smart phone, e.g., an Android® powered device, having an interactive display 131, a computer having an interactive or non-interactive display 132 (interactive being associated with the key board and mouse of the computer and/or a touch-enabled display), and a cell phone having a smart phone display 133. In the embodiment of FIG. 1 the smart phone and display 131 may be located in a sports bar in South Carolina, and using the bar's Wi-Fi network, which would then become a part of the pathway 109 and the network 140.

The fans have the ability to communicate between themselves. Thus, the fans can send messages to each other, post information on public media, and send URL links to other fans. This can include real time data, for example, a message from the user of display 131 to the user of display 132—"Dude . . . [link], Jimmie Johnson is going to pass Jeff Gordon in 5 laps"—with the [link] providing predictive data from the possessing system 139 showing a 87% chance that in the next 5 laps Jimmie Johnson will pass Jeff Gordon. Because the processing system 139 has historic data and information, the user of display 132 can respond— "OMG, . . . just like back in 2010 at Martinsville [link]"— where the link is to a video clip of a similar situation, and also has historic derived data provided with the video.

Users may also publish real-time and historically recorded analyses to other users by pushing, for example, and interface configurations (e.g., data on selected drivers within an interface) and even drawings upon the interface using websockets technology that is traditionally only created via broadcaster software and television.

In the embodiment of FIG. 1 there is also provided information of raw data, derived data, and predictive data, along pathway 181, which is specifically designed to provide information relating to race and driver safety. This information is sent along pathway 109 to a race official master center (not shown in the figure). In addition to safety, other specific derived and predictive information could be sent, which for example, could be tailored to provide information about a proposed rule change, so that the effect of this rule change could be analyzed in a scientific manner.

Figure 2A:
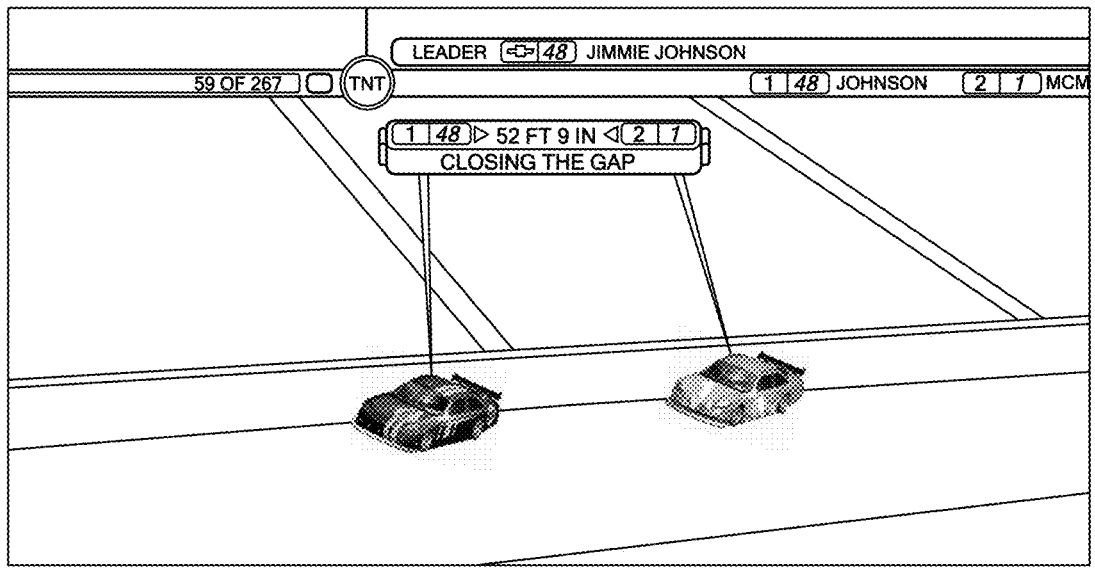
FIG. 2A is a prior art display.
Figure 2B:
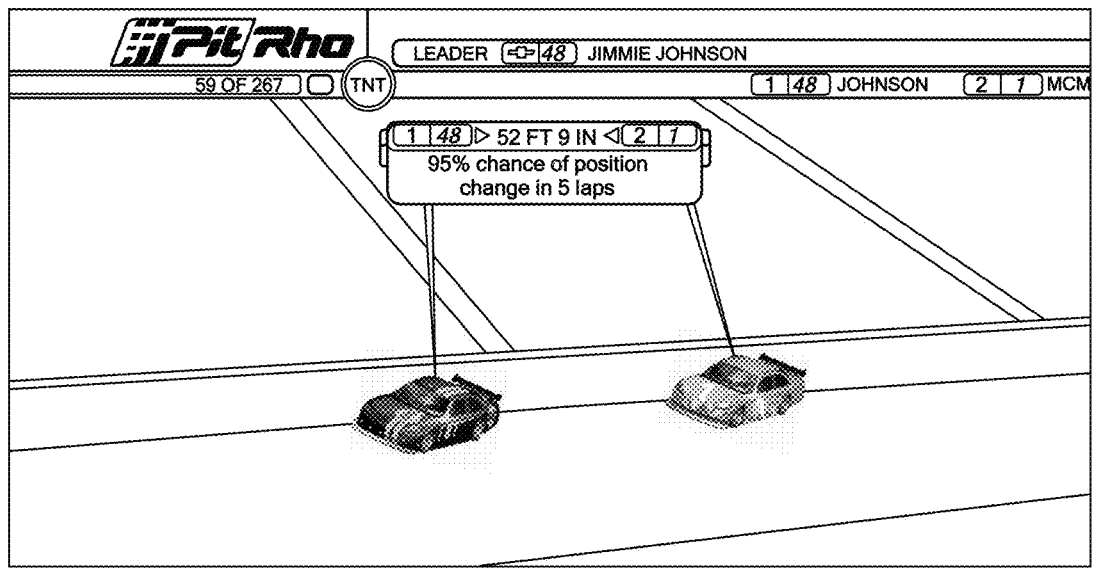
FIG. 2B is an embodiment of a display in accordance with the present inventions.

Raw data, derived data, predictive, and virtual data is provided to a commercial broad cast network 138, such as ESPN®, ABC®, and Fox® and potentially via intermediates such as Sportvision® and Stats Inc® via pathway 183, to pathway 109, to network 138 where, in particular, the derived data and the predicted and virtual data can be incorporated into, and used with their existing race broadcast technology, such as disclosed in U.S. Pat. No. 8,253,799. In this manner the combined content can be transmitted along pathway 109 to the TV 129. Turning to FIGS. 2A and 2B the substantial improvement in viewer experience can be seen between the prior art display of FIG. 2A, and the example of a display of the present invention FIG. 2B. In FIG. 2A the only information provided to the user is a network employee's opinion that car 1 is "CLOSING THE GAP" and the raw data of their distance "52 ft 9 in". In the prior art system of FIG. 2A, there is no derived data or information provided to the viewer; there is no formal analysis or computations performed on raw data; and there is no predictive information provided by the prior art system. The viewer is merely provided with the very unsupported opinion of an unknown network employee that car 1 is "CLOSING THE GAP". On the other hand, the system of the embodiment of FIG. 1 provides derived and predictive information to the viewer—"95% chance position change in 5 laps". It is believed that the providing of such derived and predictive information to the viewer will greatly enhance the fans experience in watching the race. Moving the information provided to the fan, from speculation and opinion, to objectively determined predictions based upon raw data and mathematical calculations.

Turning again to FIG. 1, in the embodiment of that figure, the data processing system 139 has a network 190 for transferring information and data between the various components. Incoming information, from pathways 191, 192, 193, is received by unit 194. Processor 195, which may be a computer, has the algorithms and programs to provide the derived data and predictive information. Processor 195 also preferably controls the network traffic with and between storage devices 196, 197,198 and unit 199 for sending and receiving information from the network. It should be understood that system 139 may itself be distributed over a network, or reside on the cloud.

Figure 1A:
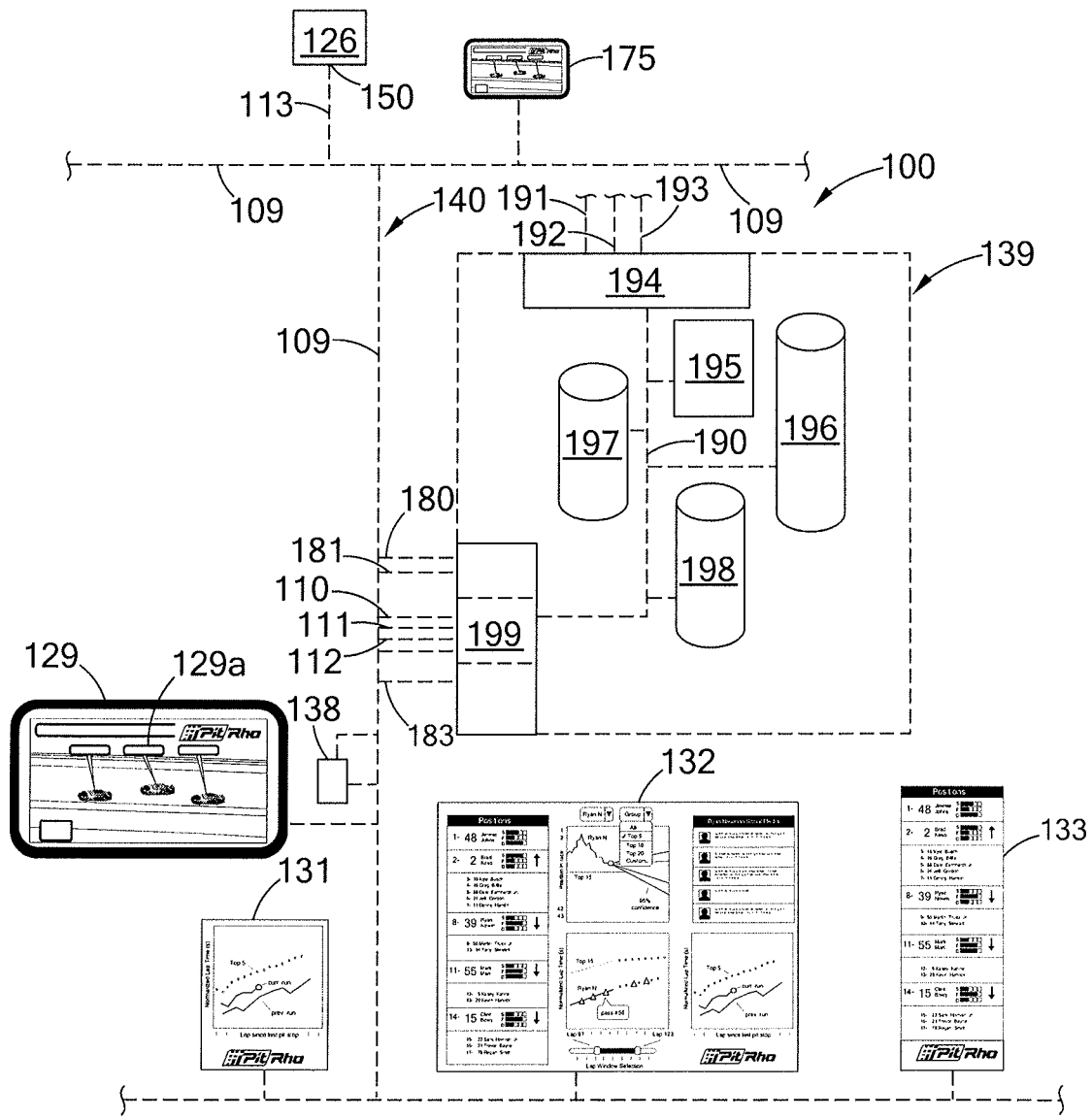
FIG. 1A is a schematic of the communications system, illustrating non-race day communications, of the embodiment of FIG. 1.

Turning to FIG. 1A, there is shown a schematic of the embodiment of FIG. 1, on the day after the race, when the racetrack is not being used and is not an active node on the network 140. Further, the fan using display 130 is not presently using the communication system 100, and thus is not shown in FIG. 1A as being a part of that system. Master center 150 is connected to the network 140 and in this embodiment is reviewing video and derived data provided by the processing system 139 to analyze the prior race and enhance and refine their racing strategy and drive technique. The network is broadcast analysis of the prior race, and is incorporating historic derived data from the processing system 139 into its broadcasts. The fans using displays 131, 132, 133 are actively sharing video clips from the race, in combination with historic derived data from the race.

Generally, the sources for incoming raw data for use in or to form a basis for the algorithms and mathematical computations that a processor performs to provide derived data and predictive information can come from, and have come from, various sources, including for example: race officials, such as NASCAR® and/or Formula 1®; PI Research; Track Pass; Race View; Sportvision; Pit Command; Fox Sports Racetrax, manufacture data, individual team measurements, transponder and receiver systems set up at the racetrack, GPS monitors on the cars, sensors and transmitters on the cars, crew and team observations, team collected data, team calculations, remote viewing and analysis of broad cast video, and fans observing the race.

Because of the complexity and unpredictability of motor sports racing, and in particular the added unpredictability that is added to NASCAR® and/or Formula 1® races, by rules, such as, the Lucky-dog (or free pass) rule and the wave around rule, although a single approach may be used, it is preferable to use a multi-approach system having two, three, four or more approaches performed at the same time to determine a set of approach values for a given event at a given point in the race. These approach values, e.g., probability of event occurring, are then given weightings based upon their individual accuracy for a particular point in the race, e.g., 5 laps forward, last 50 laps of the race, start of the race system, etc. The weighted approach values are then combined to provide a predicted value, e.g., derived data of a predictive nature.

Figure 3:
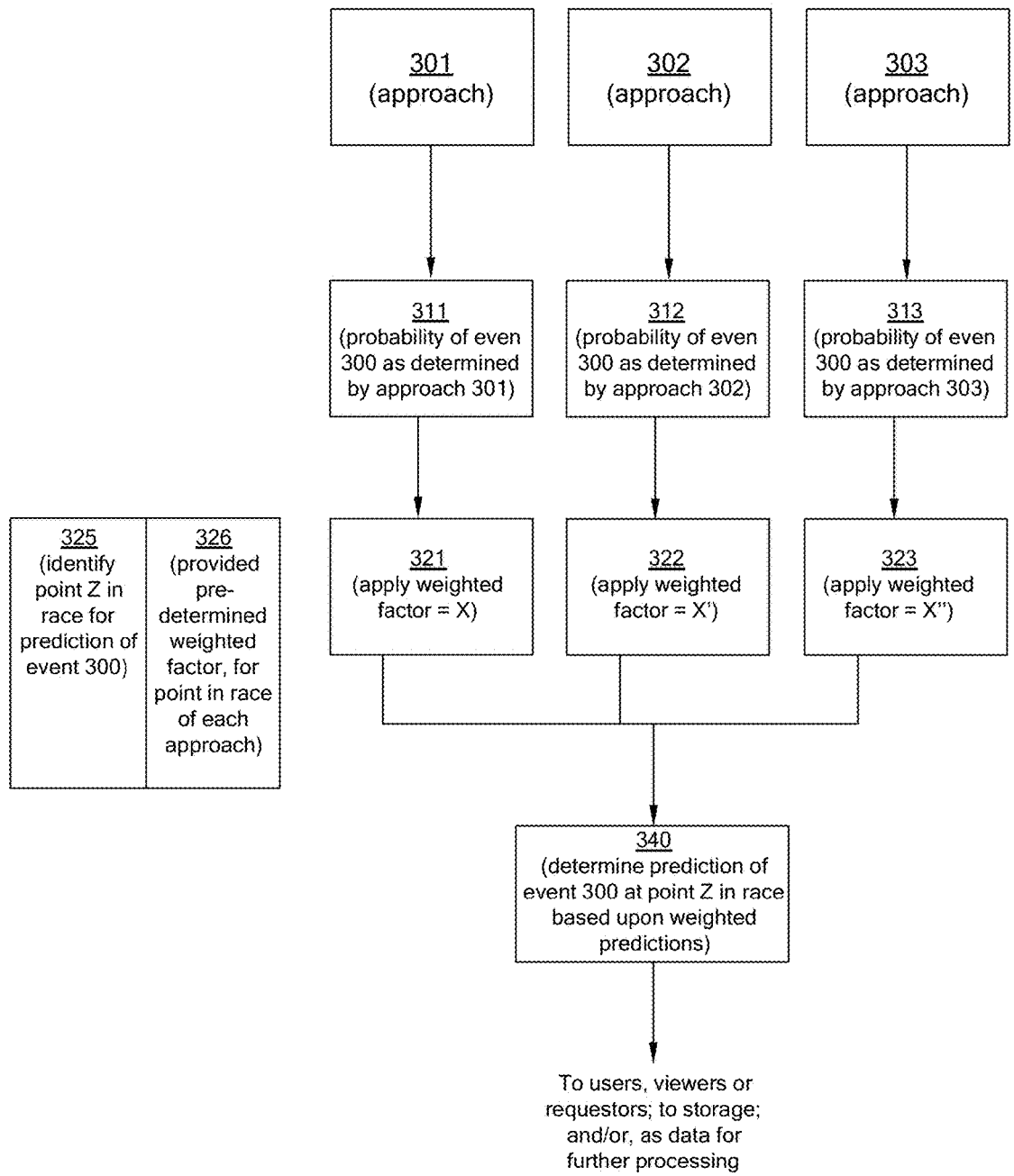
FIG. 3 is a flow chart of an embodiment in accordance with the present inventions.

Turning to FIG. 3, there is shown a flow chart of an embodiment of a method of using a three-approach system to provide derived data that is predictive of an event 300, e.g., change in position, occurring at point Z in the race. A mathematical approach 301 looks at real time raw data and historic derived data and determines a probability 311 for event 300 to occur. Another mathematical approach 302, uses calculations different from approach 301, and looks to real time raw and derived data and determines a probability 312 for event 300 to occur. Another approach 303, which may be the same mathematical approach as approach 301 or approach 302, or may be different from both, looks to other data, not relied upon in approaches 302, 303 and provides a probability 313 for event 300 to occur.

The point Z in the race where the prediction of even 300 is desired, or sought, is then determined 325, or identified typically by the fan, user, crew chief, a processing system, etc. This point Z could be as a time value, a lap value, a range of laps, or a number of laps with respect to an event in the race, such as laps to finish, laps from start, including all laps in the race, and combinations and variations of these. Further, any distance or time units may be used for Z, e.g., laps, miles, feet, meters, seconds, minutes, etc. Weighting factors, preferably for the point in the race Z, are then selected 326.

Weighting factors X, X', X" based upon Z are then applied to the predicted values 311, 312, 313 to render weighted predicted values 321, 322, 323. Preferably the weighting facts are predetermined 326 for each value of Z, or they may be determined based upon predetermined parameters at the time of use. The weight values can be any integer, or fraction. The weighted predictive values 321, 322, 323 are then combined to provided a predicted value for even 300 at point Z, e.g., 80% chance that Clint Bowyer will move up two positions in the next 15 laps.

Figure 4:
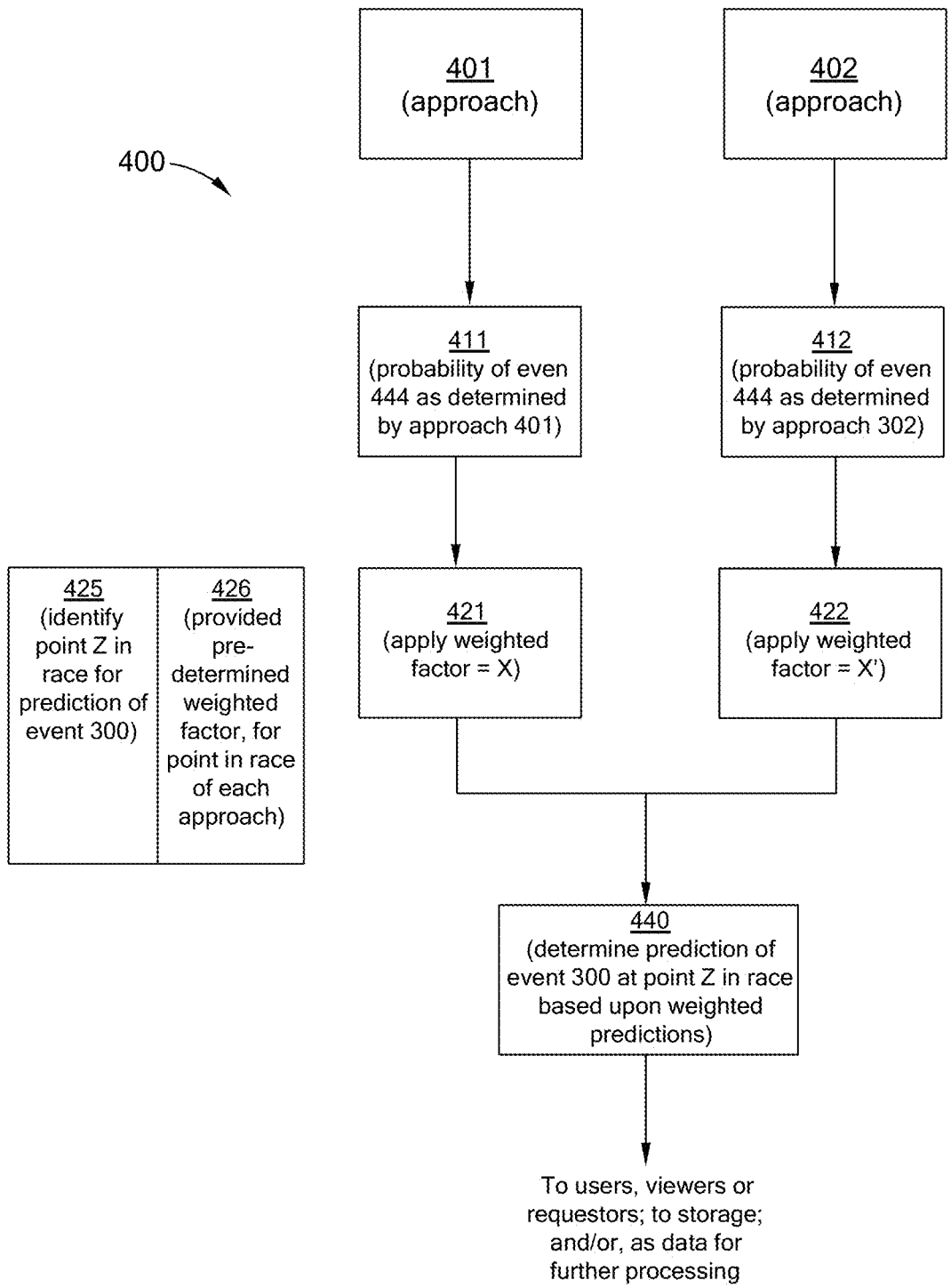
In FIG. 4 is a flow chart of an embodiment in accordance with the present inventions.

Turning to FIG. 4, there is provided a flow chart for an embodiment of a two-approach system 400, to provide derived data that is predictive of an event 300, e.g., change in position, occurring at point Z in the race. Thus, a statistical approach 401 and a deterministic model approach 402 are used. Approach 401 determines a probability 411 for event 300 to occur. Approach 402 determines a probability 412 for event 300 to occur. The point Z in the race where the prediction of even 300 is desired, or sought, is then determined 425, or identified typically by the fan, user, crew chief, a processing system, etc. This point Z could be as a time value, a lap value, a range of laps, or a number of laps with respect to an event in the race, such as laps to finish, laps from start, including all laps in the race, and combinations and variations of these. Further, any distance or time units may be used for Z, e.g., laps, miles, feet, meters, seconds, minutes, etc. Weighting factors, preferably for the point in the race Z, are then selected 426. Weighting factors X, X' based upon Z are then applied to the predicted values 411, 412 to render weighted predicted values 421, 422. The weighted predictive values 421, 422 are then combined to provided a predicted value 440 for even 300 at point Z, e.g., 80% chance that Clint Bowyer will move up two positions in the next 15 laps.

The statistical approach 401 uses real time raw data, real time derived data and historical derived data in an appropriate probability distribution, such as a gamma probability distribution, beta-binomial probability distribution, standard normal probability distribution, beta probably distributions, or the Dirichlet probability distribution. Thus, for example approach 401 can use current car position, current normalized lap time, laps since last pit stop and power rating to project the probability of a position change project "n" laps into the future.

Figure 4A:
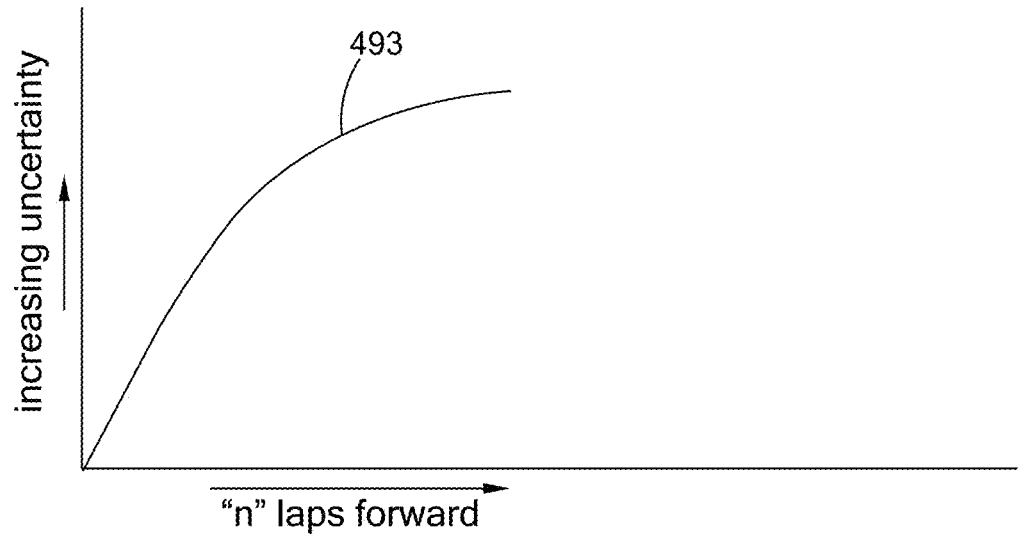
FIGS. 4A & 4B are charts of embodiments of data in accordance with the present inventions.
Figure 4B:
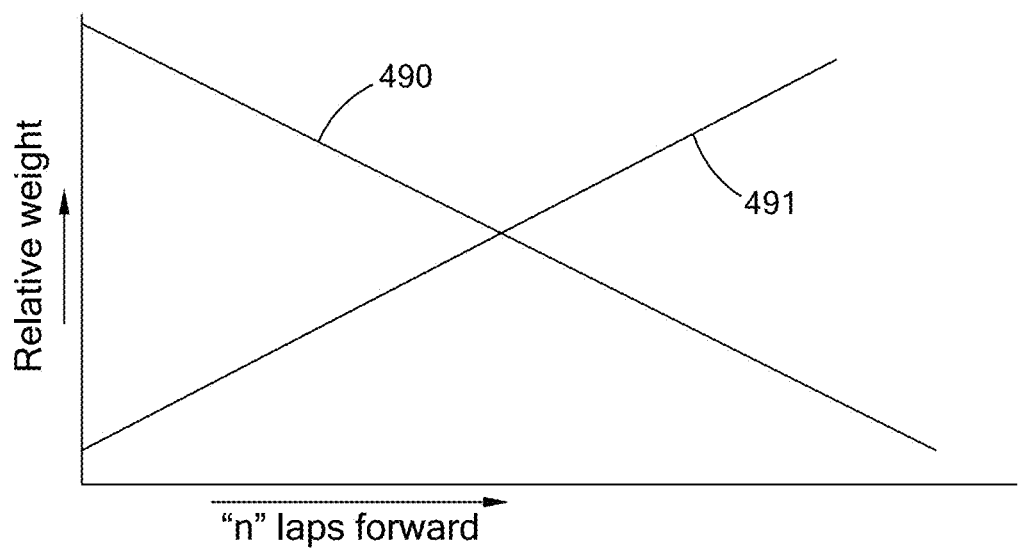

As "n" becomes larger the uncertainty around probability value 411 increases. Thus, FIG. 4A shows a curve 493 of future uncertainty vs increasing "n". Similarly as "n" increases, e.g., one is looking to predict further out into the future, the certainty, and thus the relative weight for certain data used in the approach change. Thus, as shown in FIG. 4B, the relative weight of the current car position 490 decreases as the prediction is further out in time; while the relative weight of the power ranking 491 increase when the point for the prediction is further out as time, e.g., increasing "n."

The deterministic model approach 402 has higher certainty in predicting events that are not as far out into the future, i.e., smaller "n" values. In particular the deterministic model approach 402 has greater certainty of its values toward the end of race, such as when there are less than about 75 laps, less than about 50 laps, less than about 25 laps, and less than about 10 laps. In the deterministic model the lap time for each car is evaluated against a field average lap time with a specific degradation factor or model for that race. This evaluation provides a predicted lap time for that car for each lap looking forward since its last pit stop. From this the time to complete n laps into the future can be determined for a particular car. Which in turn when compared against the real time difference between two cars at initial time $n_0$, the time difference will predict which care will finish n laps first, i.e., who will be in the lead after n laps.

Figure 5:
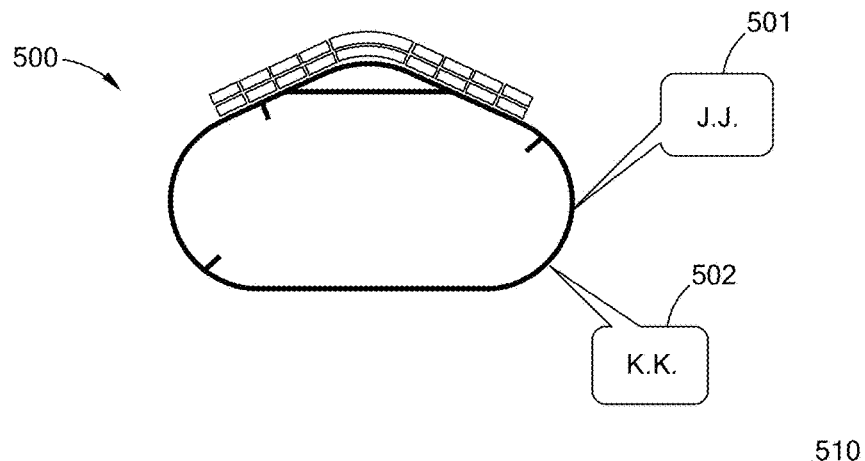
FIG. 5 is a schematic setting forth an example of an application of the embodiment of FIG. 4.
Figure 5:
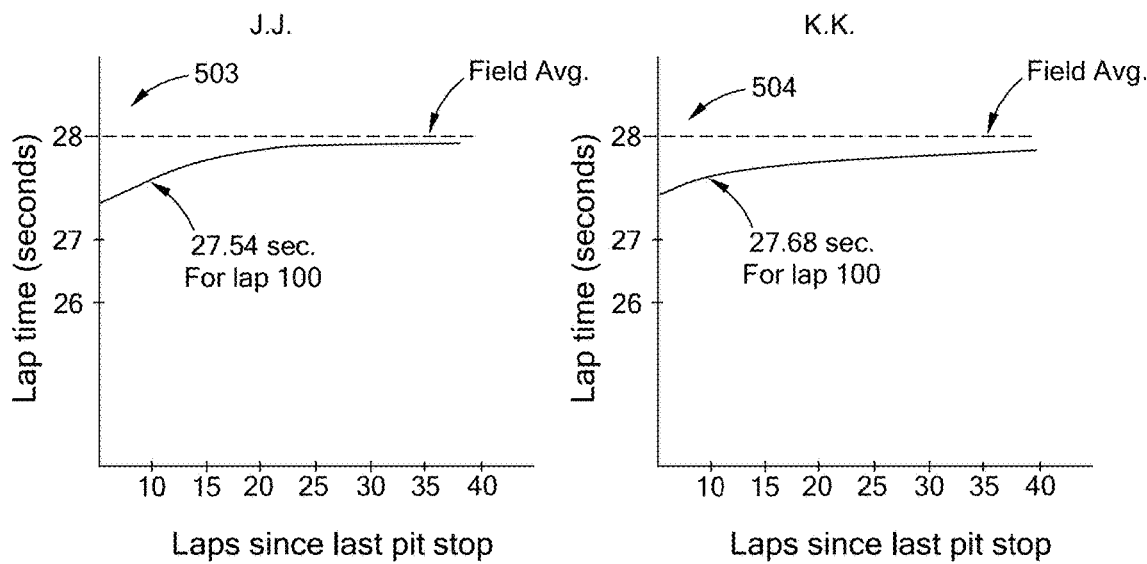

Thus, turning to FIG. 5 there are shown tables, and graphs illustrating and example 500 of an application of the analysis approach of the embodiment of FIG. 4. Lap $n_0$=lap 100 of the race 505. The lap time for lap 100 for J.J. (Jimmie Johnson) 501 is 27.54 seconds and K.K. (Kasey Kahne) 502 is 27.68 seconds. Further J.J. is 1.74 seconds ahead of K.K. and both are on the same lap. The field average is 28 seconds. Using the deterministic approach curves are plotted for J.J.'s lap times 503 after last pit stop and for K.K.'s lap time 504 after last pit stops, which are used to determine that it will take J.J. 1,395 seconds to travel the additional 50 laps, i.e., finish lap 150 and K.K. 1,389 seconds to travel the additional 50 laps. Thus, it is predicted 510 that K.K. will complete the additional 50 laps in 6 seconds less that J.J. and overtake J.J.

In operating a broad network over large distances, e.g., across the United States, Europe, globally, in the cloud, and utilizing satellite communications, latency issues should be considered in the design and configuration of the network. Thus, for example, when predicting or providing information about a race car traveling at speeds in excess of 100 m.p.h., 150 m.p.h., 180 m.p.h. or potentially greater, speed of processing and transfer of information and data over the network should be considered and preferably optimized. Thus, for example, if the data processing assembly 139 of the embodiment of FIG. 1 is located in the cloud a latency period may be present.

Preferably this latency period can be reduced, e.g., processing, and data and information transfer can be optimized through several approaches that can be used individually, across the entirety of the network, for only selected paths, or nodes, in the network, and combinations and variations of these. Thus, enhanced communications protocols, data compression, and the like can be employed. In one embodiment of an enhanced network to reduce latency a distributed processing network is used. In this network configuration two, three, four or more processors, computers or data processing assemblies can be used. Thus, real-time data can be input locally to a local processor, for example in a car, a hand held device at the track, or in a pit box. The computations from the local process can then be distributed. Further multiple processors, a well as a central process, should one be so designated, may preform operations on the same, or similar data. Thus, for example an observer in an adjacent pit box, may observe and enter data into a processor at her pit box, regarding the adjacent pit activity. This information may be different from, in addition to, or even contradictory to data observed and entered by a different observer. The processors, thus, should have the capability to review, compare, select and update actual, derived and predicted data as more information is made available over time to the network.

Thus, for example, a first processor can be located a pit station 1, and obtain observed information and information from the local race track feed during the race, e.g., pi data, a second processor can be located a pit station 2, and similarly obtain observed data and information from the local race track feed. These two processors can each then process the information and transmit their respective actual, derived, and predictive information for distribution, subsequent processing or reconciliation. The two processors, could also function as a single process, where reconciliation of their respective data takes place prior to the information being transmitted to the network. This also provides pit cures with the most current, least lag time data, where such data is most needed and beneficial.

These distributed networks may further be configured for a particular team or for a particular car manufacturer. Thus, for example, the GM manufacture has a local processor at the track, and each GM car's pit has a local processor. The local processors, at the pits receive actual data in the form of Pi data and data from observers, the GM processor receives Pi data and actual information from video observation and from engineers at corporate headquarters. The actual data, the derived data, and the predictive data are reviewed and further processed, and presented locally at the track (essentially instantaneously, with minimal lag time) and then sent to the network and to remote processors. Information from remote processors is also sent back to the local processors. Thus, in these systems there can be one, two, three, four or more local processors, there can be intermediate level processors controlling one or more local processors and there can a remote processors, for example in the cloud, that can also be a master controller for the network. The processing and network management can be handled by this master controller, or the duties may be separated into several master controllers, or relegated to other controllers, such as intermediate or local processors. Thus, in these networks, various control parameters, processes, data and inputs can be distributed across the entirety of the network, in various combinations and hierarchies.

Further it is advantageous for the network to have the ability to transfer software updates to various distributed processors, input devices and viewing and display devices; as well as having the ability to perform remote analytics on such distributed devices.

Figure 11:
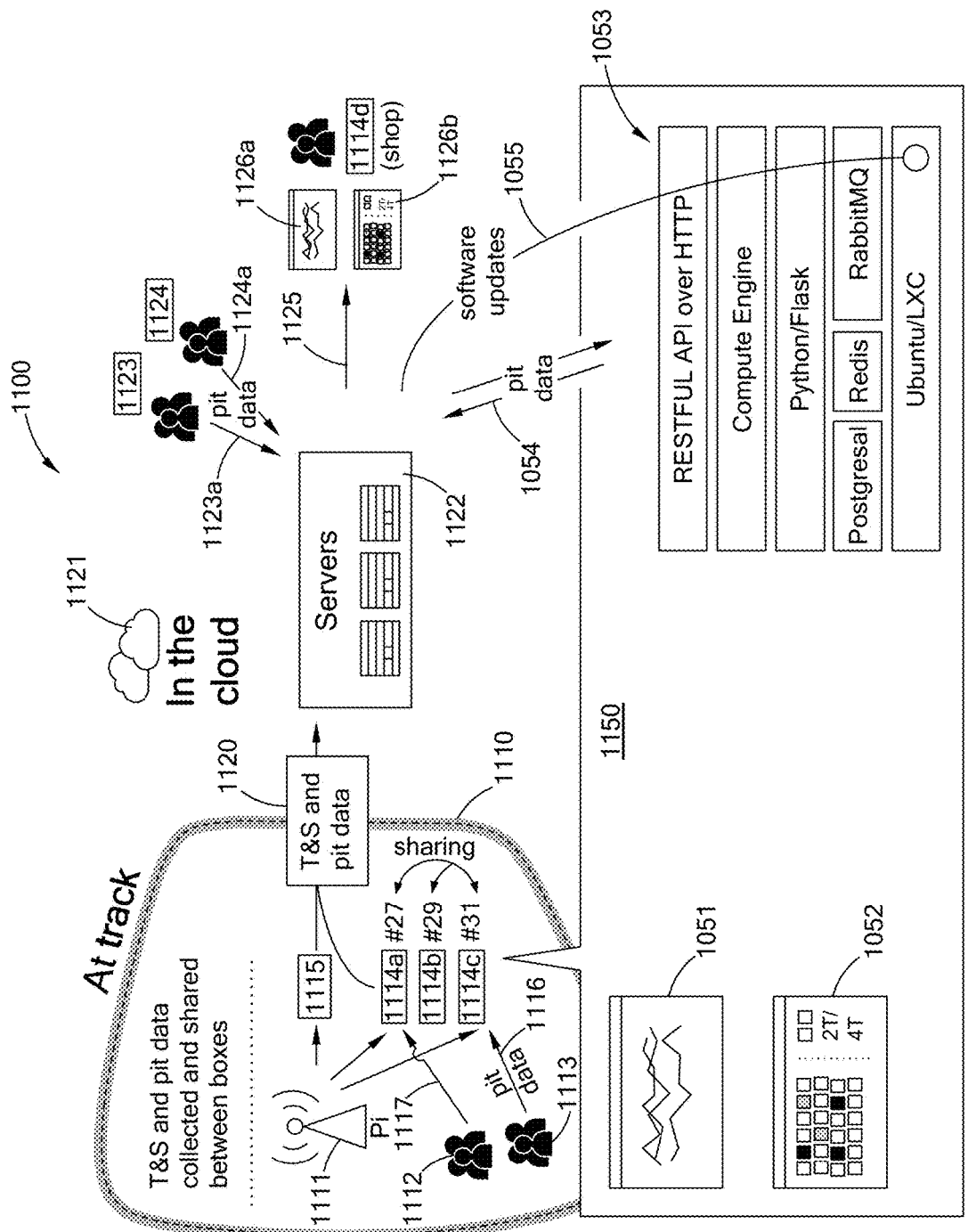
FIG. 11 is a schematic of an embodiment of a system in accordance with the present inventions.

In a distributed network, of the type of the embodiment of FIG. 11, actual data, e.g., real time data for what occurred during lap 5, may be coming into to various servers at different times, e.g., as late as lap 6, 8 or 10, as this non-realtime, or latent, actual data is received by various servers in the net work, and preferably the master server in the cloud, it must be reconciled and incorporated into the existing actual data for lap 5, and further as this latent actual data is verified, incorporated and processed, updated and enhanced derived and predicted data should be generated and broad cast to users on the network. In this manner there is provided a system where the accuracy of predictive data is steadily increased, as additional latent real time information is received and processed; and more preferably, there is simultaneously provided essentially instantaneous derived and predictive data at the local servers and GUIs, based upon the then available information.

Figure 17:
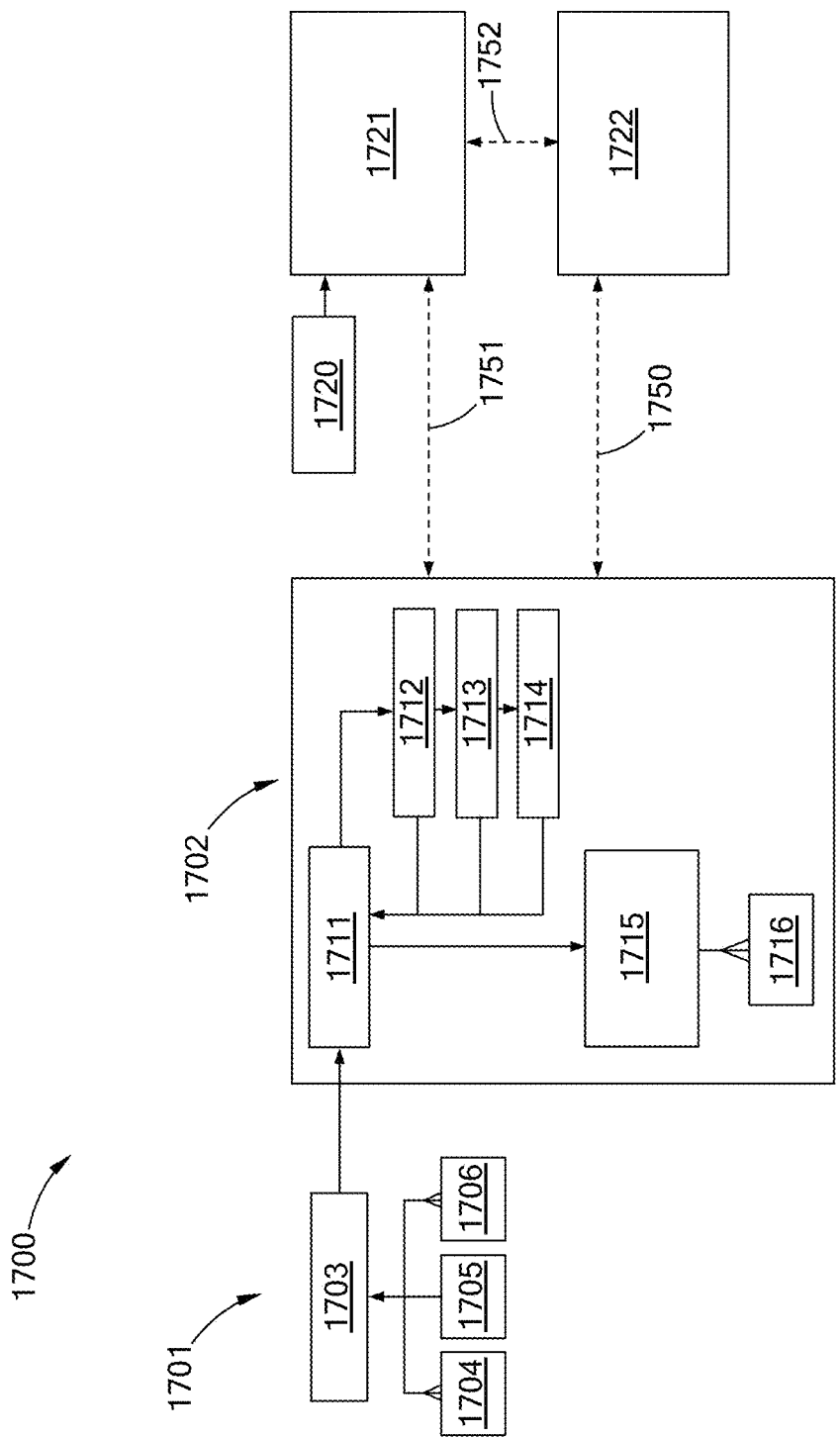
FIG. 17 is schematic of a flow diagram of a configuration in accordance with the present inventions.

Turning to FIG. 17 there is show a flow chart of an embodiment of how single server instance 1702 operates in isolation and how data can be shared across multiple server instances 1700 (both local and in the cloud). Thus, raw data sources 1701, which may include pit strategy submission 1703, which is based upon information from, for example a PDE 1704, a PDA 1705, and other 1706 data entry or providing sources, e.g., machine vision. These sources 1701 are connected to, e.g., transmit data and information to, a single server Instance 1702. Thus, for example the embodiment of FIG. 17 may be used, or applied to, the embodiment of FIG. 11.

Preferably all raw data flowing into a single server instance 1702 goes through a conflict resolution flow 1711: the first pit strategy submission seen 1712 for a specific Car+Lap Number is accepted as the master pit strategy 1715. If three or more submissions exist for a Car+Lap then a majority rules algorithm 1713 is implemented (in the event there are two or more conflicting groups of equal quantity then the group that contains the earliest submission is accepted as the master pit strategy 1715). The master administrator 1714 can override any strategy at any time (and can prevent any further revision by any means other than another administrator override).

Thus, the master pit strategy 1715 for a Car+Lap is pushed to all listening racing analytics applications 1716. Further, anytime the master pit strategy 1715 changes, this change is incorporated into any derived data and listening analytics applications 1716 will be revised appropriately.

Multiple server instances 1700 and their communication both locally and in the cloud, are also contemplated and in some instance may be preferable. In this configuration all instances 1702, 1721, 1722 can share raw, 1701, 1720 and administered data, as shown by dashed lines 1750, 1751, 1752. In this manner not all server instances require raw data sources connected directly to that instance. Thus, as shown in the embodiment of FIG. 17, single server Instance 1722, does not have raw data sources directly connected, but instead gets all data as shared from other server instances, e.g., 1721, 1702.

Further, multiple administrator scenarios, or embodiments can be utilized. Thus, for example, methods or configurations for multiple administrators on multiple server instances that are sharing data would include embodiments were: all instances share raw data but do not share administered data; all instances share raw data and administered data and administered data has the same conflict resolution flow as raw data (e.g., 1st seen then majority rules); all instances share raw data and administered data and administered data conflicts are resolved based on a master-slave relationship in which a single instance is designated as the master and all other instances are slaves; and combinations and variations of these.

The power ranking is derived data that is based upon historic performance of the team, and can include or be based upon, for example: the team, e.g., the driver, owner, car manufacturer, engine manufacturer, and crew chief; the team's prior performance at similar race tracks; the team's prior performance at the same race track; each team member's performance at similar race tracks; each team member's performance at the same race track; performance at track during practice before race; qualifying performance.

Other forms of derived data use generalized machine learning algorithms such as Support Vector Machines to predict or classify race events. These predictions or classifications are forms of derived data. One possible prediction is the probability that a particular raceteam—raceteam A—will beat another raceteam—raceteam B. This prediction can be made using a set of features (also derived data) that describe raceteam A and B raceteam, or during, a race. This features may include, for example, the fraction of time during which raceteam A has been on the lead lap during recent races; or, similarly recent races that were held on tracks that are similar to the track upon which the current race is being held. The similarity of tracks can be derived data and may be based on a number of characteristics of the tracks including the inclination, length, and shape. Other derived data describing raceteams that are used for prediction may include raceteam speed, normalized lap times, passing characteristics, relative qualification position, qualifications speeds, or pit times. Given a set of historical outcomes in which the prerace derived data are known and an outcome is known—e.g. raceteam A beat raceteam B—machine learning techniques may be used to find a mathematical technique for predicting an outcome based on the prerace derived data. For example, Support Vector Machines may be trained on historical data to create a classifier that can predict the probability that raceteam A will beat raceteam B, given their prerace derived data. For example, this prediction may indicate that raceteam A will beat raceteam B with probability 0.67.

Normalized lap time is derived data that is a comparison between a car's lap time and the lap time of a comparison group of cars that have completed the same number of laps since the prior pit stop. This comparison group of cars might be all cars in the same race, a subset of cars in the same race, or results from previous races at the same track. For example, J.J. (Jimmie Johnson) completes Lap 100 of a race in 27.58 seconds after having completed a pit stop on Lap 80, which indicates that it has been 20 laps since his previous pit stop. The average lap time for all other cars in this race which also meet the criteria that laps since last pit is 20 was 28.00 seconds. Therefore, Jimmie Johnson's normalized lap time is −0.42 seconds.

Inferential techniques can be used to determine when a car has pitted or what actions have been taken by a car's pit crew in the pit stop where GPS is not available (for example, off road events, other race types and tracks in addition to NASCAR and/or Formula 1®). Inferential techniques for pit identification represent derived data. These techniques would take as input raw data and/or other pieces of derived data. Inference could be performed, for example, via use of heuristics based on industry knowledge or statistical techniques for pattern recognition.

Adjusted lap times are generated within a race by calculating the impact for the entire field of tire age, number of new tires (0, 2 or 4) taken on the previous pit stop, traffic as defined by the number of cars in close proximity, racing position (1st, 2nd, etc), time in the race, fuel saving strategy, and damage to the car. The effects can be removed from raw lap times to generate adjusted lap times, allowing a direct comparison of car speeds regardless of current strategy and position. Furthermore, speeds from different points in the race (e.g. the beginning of the race compared to the middle) can be compared regardless of changes in track condition (e.g. sunset or changes in temperature), so that a car's speed relative to itself can be calculated for points throughout the race.

Adjusted lap times can be calculated retrospectively by calculating the magnitude of the impacts listed above (in seconds per lap). They can also be updated in real-time (i.e. in-race) through the use of bayesian regression.

Adjusted lap times may be used for prediction of future events by enabling simulation of alternative scenarios. For example, one might compare the cumulative time required to finish the race after taking two new tires or four new tires. The scenario with a lower cumulative time would be the preferred scenario. For example, adjusted lap times may be used to project: the position change a car will experience in electing to take a green flag pit stop; the projected finish position of taking two tires versus four tires during a pit stop; and the optimum lap on which to take a pit stop to obtain the best expected finish position.

Examples of raw and derived data that might be used for pit stop identification include: a car's lap time in relation to the same car's adjacent lap times, a car's lap time in relation to the lap times of other cars on the track, a car's lap time compared with the lap time of a car previously identified as having pitted, a car's lap time compared with the lap time of a car previously identified as having not pitted, a car's change in position during a yellow flag sequence, the change in position of a car relative to a car previously identified as having pitted, the change in position of a car relative to a car previous identified as having not pitted, the remaining fuel in a car's fuel tank as an indication of the need to pit, the number of laps since the previous pit stop as an indication of the need to pit, aggregated information from viewer observations (e.g. Twitter references to pit stop).

In some uses, derived and predictive data and virtual data are displayed to users through a client, e.g. a web browser. These data are sent to the client from a server, or from other clients. In some situations, the client will request new data constantly because it is difficult to know if a particular piece of data has been updated. Preferably, the client and/or server is able to determine which data are likely to have changed at a point in time, and therefore prioritize the communication of data that are likely to have changed. This scheme decreases unneeded communication between clients or between clients and servers. The server may determine that particular data are likely to have changed and push that data to the client, or the client may determine that particular data are likely to have changed and request those data from another client or a server. For example, the client may know that the normalized lap time derived data will only change when a driver has completed a lap of the race. Therefore, the client will only request that the normalized lap time data be updated after a driver has completed a lap.

A user may desire to share a particular race event with other target users. To do this, the client creates an identifier, such as a URL, that will allow target users' clients to approximate the view of the original user. For example, a user may which to share a set of derived or predictive data at a particular point in time with target users. In such a case, the client generates an identifier that can be sent to the target users and contains, or references, the information needed to recreate the set of derived or predictive data at that particular point in time. This may, for example, be a URL that includes or references various identifying aspects of the derived or predictive data including a race identifier, raceteam identifier, driver identifier, time identifier, display preferences identifier.

In addition to the NASCAR race track illustrated in FIG. 1 it should be understood that the present inventions have applicability in other types of motorized and non-motorized vehicle racing, as well as other types of multivariable component system, and would include, for example all NASCAR sanctioned or administered events, Indy Car, Grand-Am (sports car racing), Formula 1®, all forms of European motorized and non-motorized racing, e.g., F1-GP2, ALMS, WTCC, BTCC, and the Tour de France, as well as other types of racing such as road rallys, endurance races, and the like.

EXAMPLES

The following examples are provided to illustrate various uses and displays of derived, predictive and virtual data. These examples are for illustrative purposes, and should not be view as, and do not otherwise limit the scope of the present inventions.

Example 1

A 'Second Screen' application on a large display is in a track suite where fans, sponsors, owners, etc. are able to watch a race while also having one or more televisions and other electronic devices. Currently the existing televisions play the race as broadcast on the partnered network (e.g., Fox Sports, Speed Channel). The 'Second Screen' application running would provide additional information to enhance the race experience and allow for a deeper understanding of the race as it progresses.

Example 2

Figure 8:
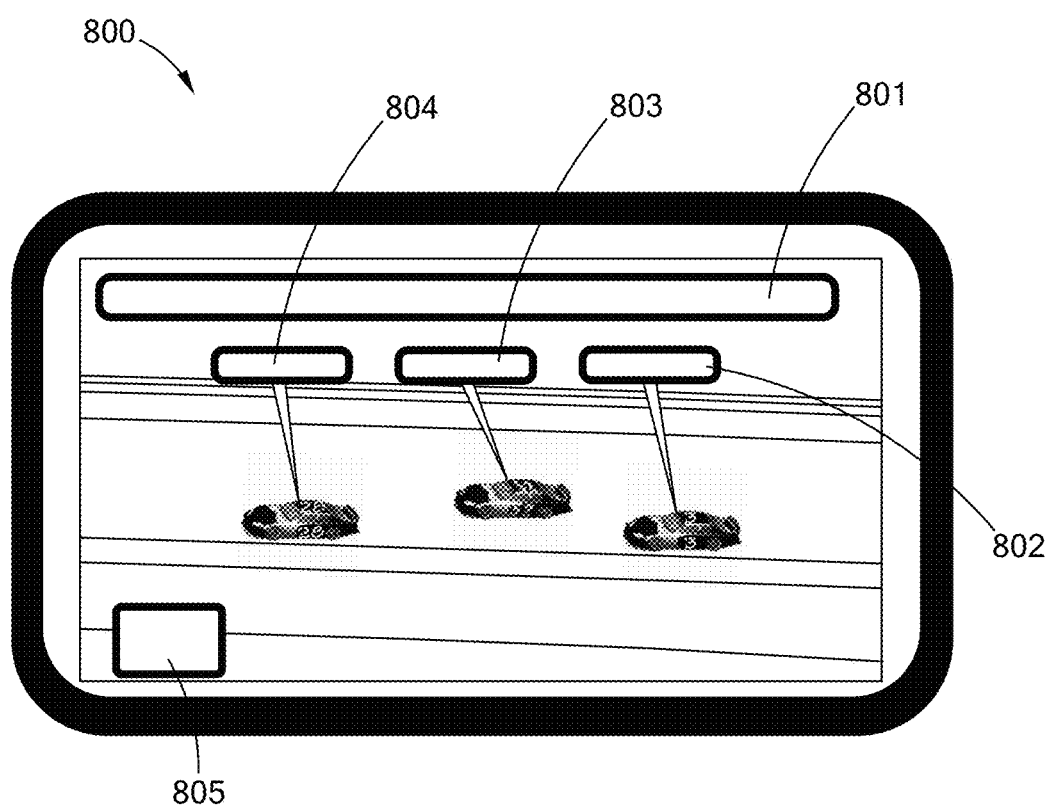
FIG. 8 is an embodiment of a display in accordance with the present inventions.
Figure 9:
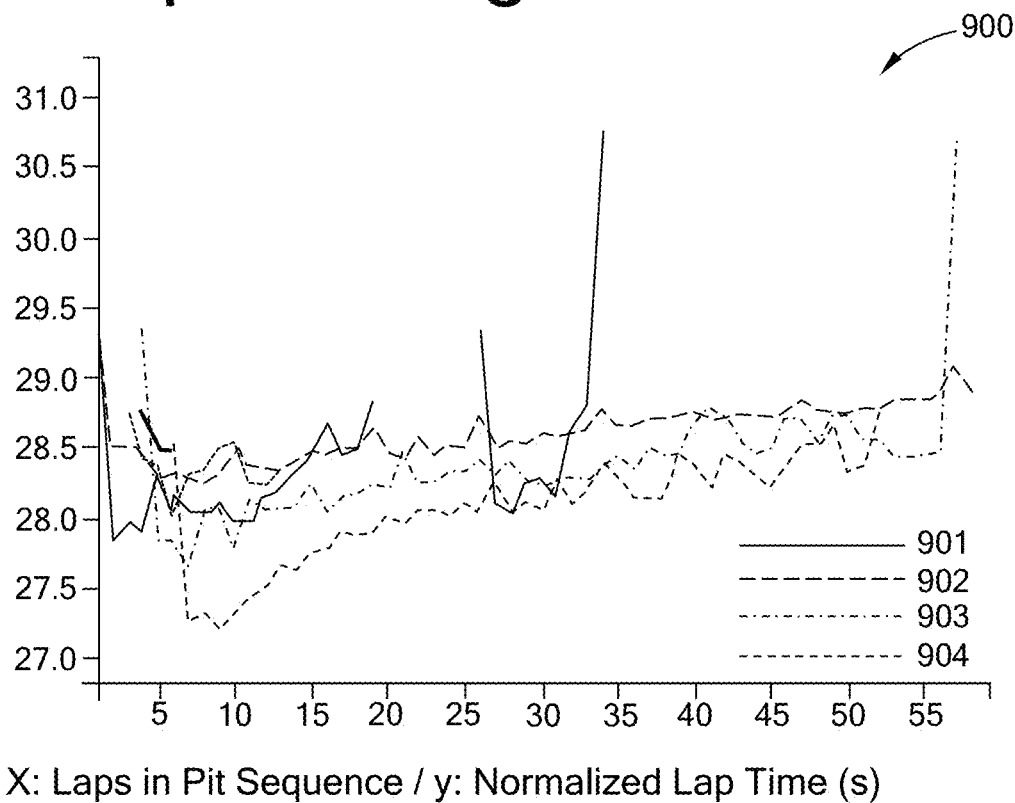
FIG. 9 is an embodiment of a display of derived data in accordance with the present inventions.

Turning to FIG. 8 there is provided an illustration of a "Second Screen" for racing teams, owners, drivers, and fans using an internet TV display 800, or similar type of entertainment display, there is field 801 that may contain raw race data, field trends, derived data and predictive data. There are fields 802, 803, 804 that are graphically associated with a particular race and that preferably display derived information, predictive information and combinations and various of these, which information is specific to that race car. In field 805 there is provided a window for chatting or other forms of Internet or other communications.

Example 3

A user of the 'Second Screen' application in the context of a mobile phone will necessarily be viewing smaller portions of the application at a time, as limited screen resolution and size precludes the display of the full application at once. In the case of a race fan, the fan keeps track of the current and historical position of their driver of interest, providing a more exciting story of how the race has unfolded (for example, Jimmie Johnson starting in $25^{th}$ and working his way up to lead the pack over the course of 100 laps). In the case of a race team, an engineer can focus on the lap-by-lap normalized time comparison between that race team's driver and a relevant comparison group (e.g., Jimmie Johnson compared to the top 5 drivers in the field).

Example 4

In Fantasy racing, fans are required to choose a lineup of drivers for their fantasy 'team'. Typically this includes 5 drivers (fantasy games vary in their restrictions on driver selection but they range from salary cap restrictions to restrictions on the number of times a driver can be on your roster in one season). The insights gained through the direct and derived statistics of this 'Second Screen' application allow for an additional level of fantasy competition wherein participants can compete head-to-head across several metrics. Metrics include but are not limited to lap-by-lap race position, fastest lap times, largest normalized lap time spread against comparison groups, biggest increases (and decreases) in track position.

Example 5

Figure 10A:
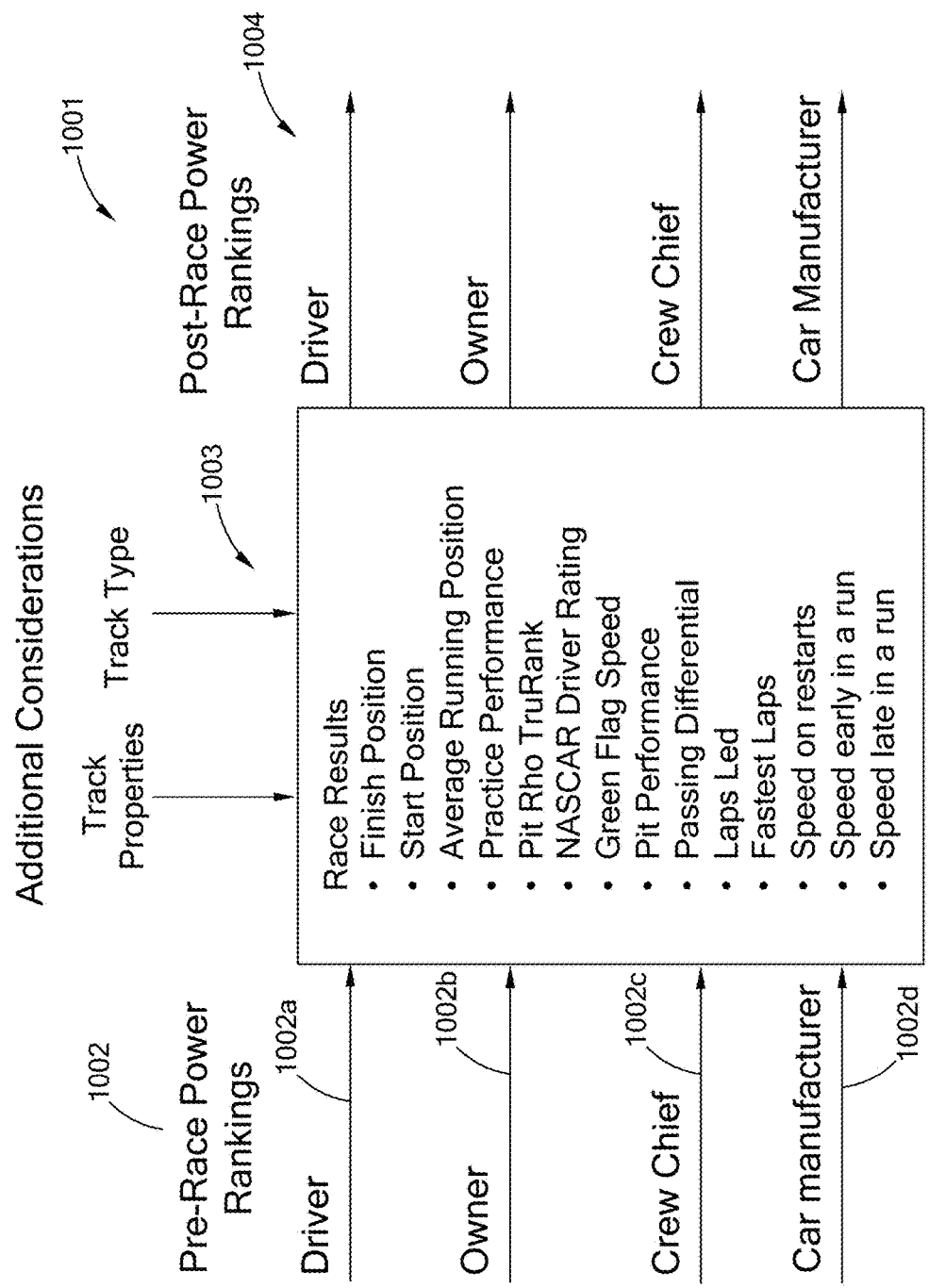
FIG. 10A is a flow chart for an embodiment of power rankings in accordance with the present inventions.
Figure 10B:
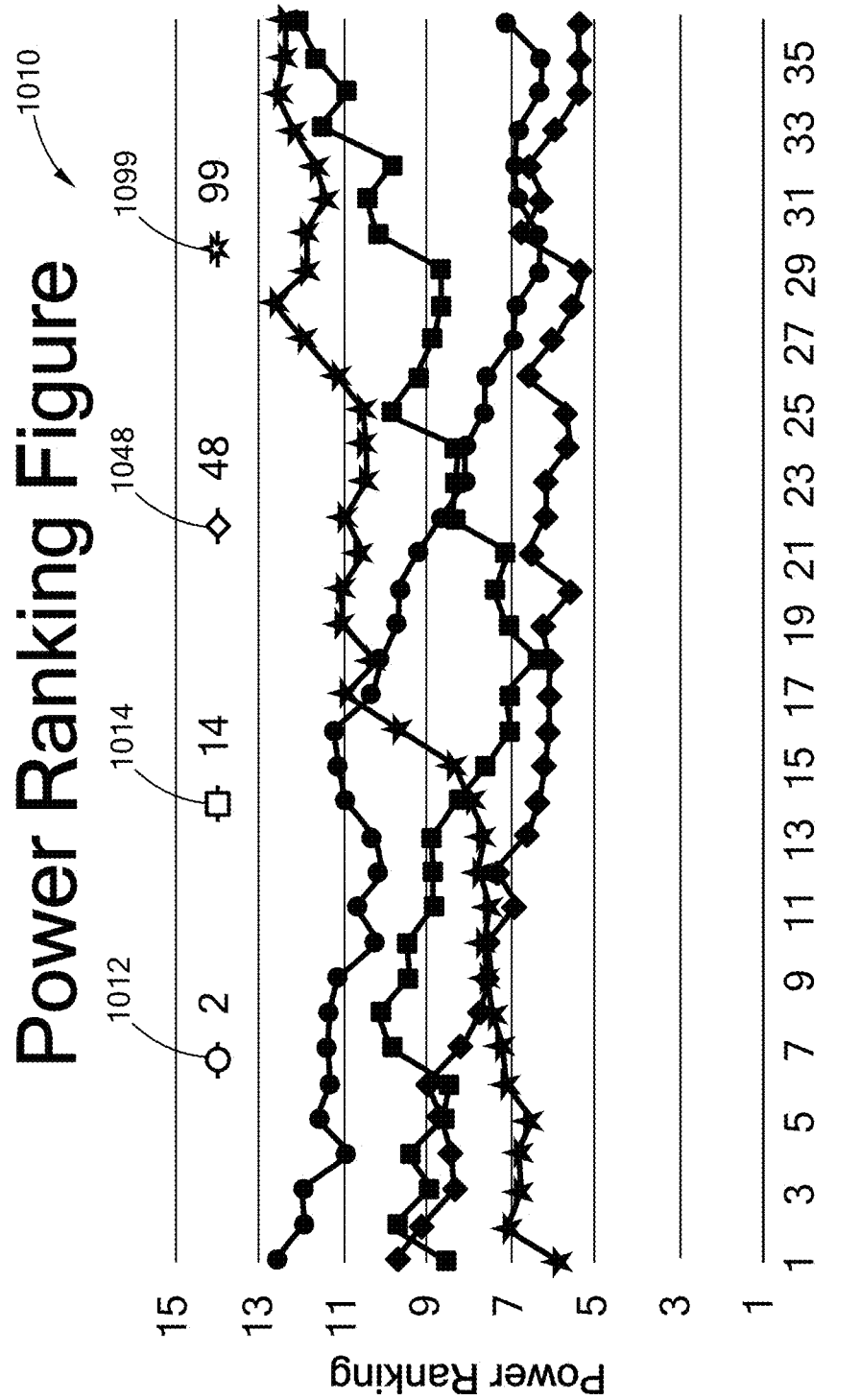
FIG. 10B is a chart for an embodiment of a power rankings displayed in accordance with the present inventions.

Turning to FIGS. 10A-10C there is provided a Power Ranking algorithm and display for driver, owner, crew chief, car manufacturing rankings. Consideration can also be given to engine manufacture, NASCAR post-event engine dynamometer results, aerodynamic differences between car models, rule changes as they impact performance and relative competitor advantage. Thus, FIG. 10A shows an embodiment of a flow chart 1001 of data flow, of pre-race power rankings 1002, based upon various factors 1002a, 1002b, 1002c, 1002d, additional consideration 1003 for use in the computations, and corresponding post-race power rankings 1004. FIG. 10B is an embodiment of graph showing the relative power rankings for car 2, 1012, car 14, 1014, car 48, 1048, and car 99, 1099 over a series of weeks. FIG. 10C is an embodiment of an algorithm to provide the computations for power ranks, such as those displayed in FIG. 10B.

Example 6

A machine learning algorithm can accurately predict heads-to-head driver win probabilities such as a support vector machine (SVM). Consideration is given to startposition, highpos, dpass, passed, fastest, lowpos, total_passing, position_change, and dozens of others of total features.

Given differences in driver stats, the SVM model predicts who will win by finding a maximum margin hyper-plane in a high dimensional space that separates winners from losers. The algorithm produces conclusions like: "Jeff Gordon will beat Kasey Kahne with 72% probability" and is trained such that those probability estimates are accurate & internally consistent.

Example 7

Figure 6:
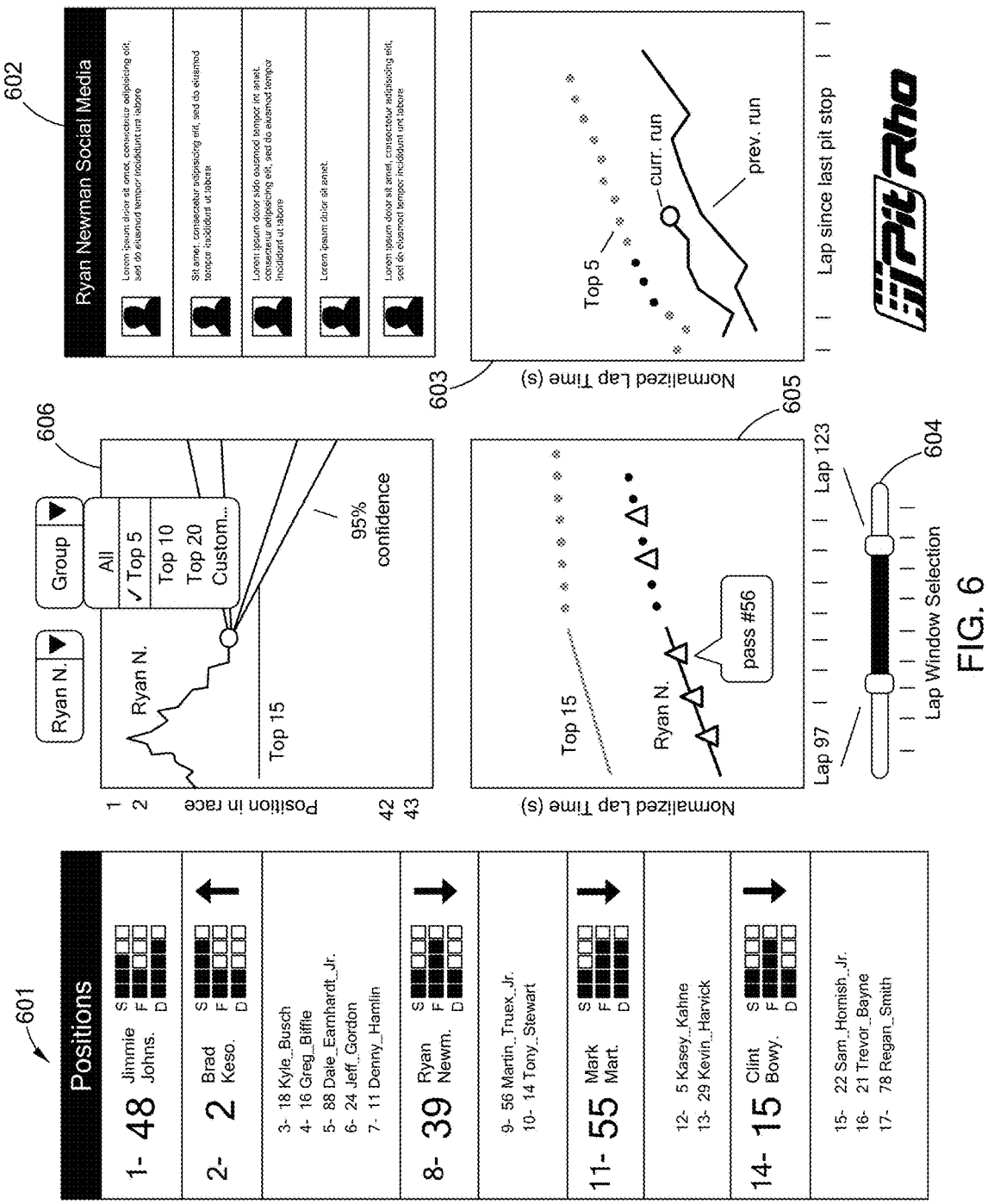
FIG. 6 is an embodiment of a display in accordance with the present inventions.
Figure 7:
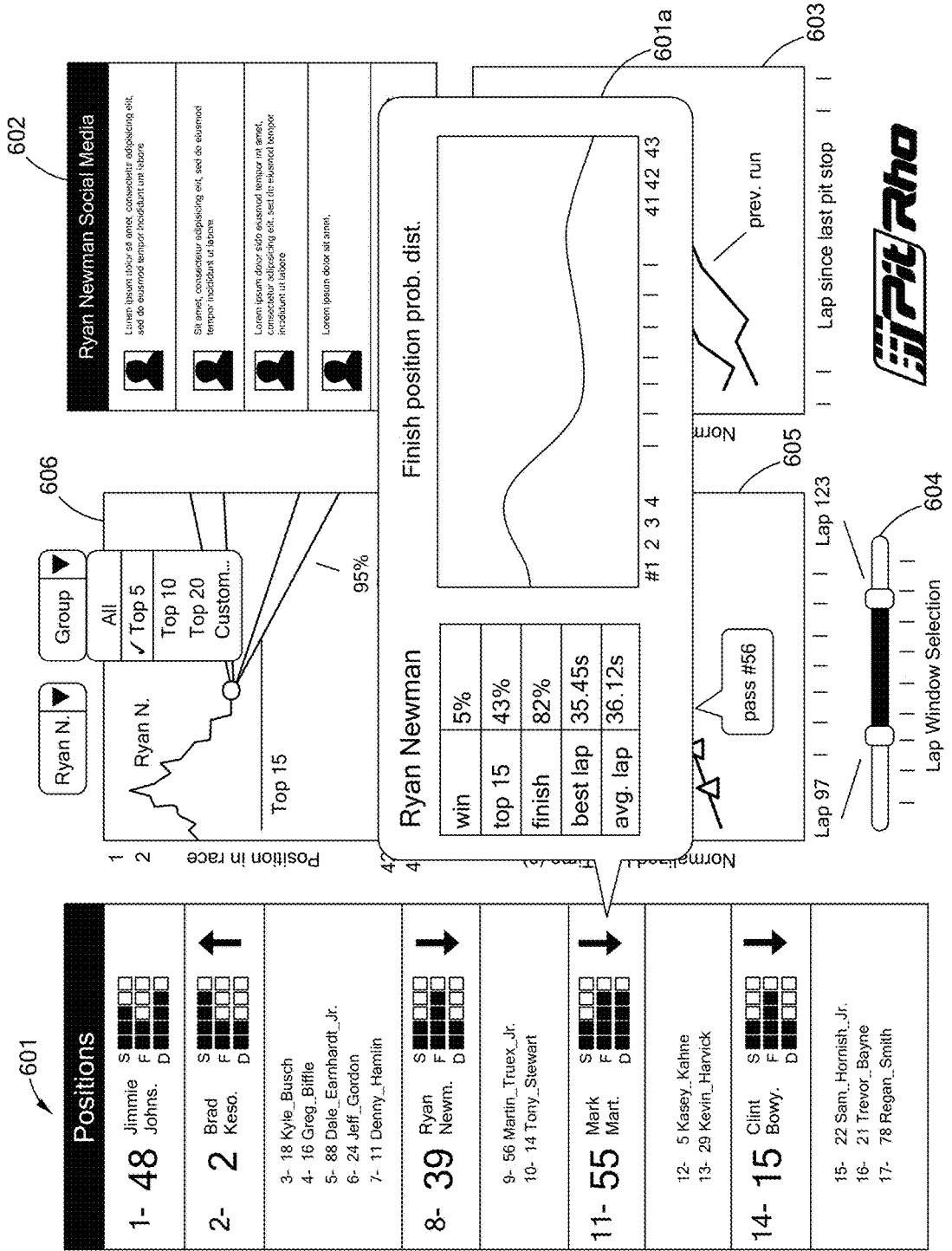
FIG. 7 is an embodiment of a display in accordance with the present inventions.

There is provided a display of a real-time probability of outcomes such as winning, top-5 finish, top-10 finish, and so on in a similar manner that odds of a Poker hand would be displayed in a televised match. Thus, turning to FIG. 6 and FIG. 7 particular drivers or cars of interest can be selected is a window 601. Various actual, derived and predicted information can be displayed regarding these cars, and data for other or different cars can viewed. FIG. 7 shows an example of a callout 601a that can provide additional information about a particular car. There is also provided a window of social media or chatting 602, a window providing pitting data 603. A lap selection bar 604, that allows the view to select, and change the laps over which, historic, actual or predictive data and information are presented. There is also a window 605 showing normalized lap time and window 606 showing predicted position in a race based upon confidence levels.

Example 8

Most race-related position information available to race fans and teams alike is more or less real-time. That is, one cannot easily call up the position of one's favorite driver at lap 50 if the race is on lap 100. This information, however, is both useful and entertaining. The 'Second Screen' application has the ability to track a driver's current position and record that position for display after the fact, thus providing a full documentation of driver positions on a lap-by-lap basis. Additionally, predicted outcomes are of interest from a practical and entertainment perspective. One of 'Second Screen' predictive capabilities is a lap-by-lap prediction of driver position within various confidence intervals.

Example 9

A display provides historical position data and predicted future positions with a mode (highest frequency position) line and probability bands (eg 75% and 95%) that extend from the current position to the end of the race.

Example 10

The raw lap time for a driver throughout the course of a race is variable and available of use. For example in a race that starts in the afternoon and finishes in the evening, the track and environmental conditions change so significantly that the absolute lap times are not comparable from the beginning to the end of the race. However, both race fans and teams can benefit from viewing a driver's normalized lap time and then comparing that lap time to a comparison group (i.e. the Top 10 drivers). This provides a clear view of whether a driver is under or over performing on a lap-by-lap basis with respect to a comparison group. A race team, for example, may use this information to identify how much time their car must make up on each lap in order to remain competitive with their comparison group of interest.

Example 11

A Second Screen display presents unnormalized and normalized lap time information with reference to comparison group.

Example 12

Each time a driver exits pit road their vehicle has had some sort of modification (whether it be additional fuel, some number of new tires, balance adjustments, etc.). Typically the vehicles will experience a decrease in speed for each lap after a pit stop. That is, they are most often faster in the laps immediately after their pit stop. Since the 'Second Screen' application derives normalized lap time, records that time for each lap, and is able to calculate when a driver has taken a pit stop, the application can overlay each 'pit sequence' in terms of normalized lap time. This is a useful view for a race team who wants to ensure they are in fact improving their lap times each pit sequence.

Example 13

A display presents unnormalized and normalized lap time information with reference to comparison group.

Example 14

A display, present self-to-self unnormalized and normalized lap time information.

Example 15

An example of an algorithm for use in Second Screen applications is set forth in the following table:

TruRank Algorithm
    GreenFlagLapTime=(Track Length)/(Green Flag Speed)
    GreenFlagElapsedTime=GreenFlagLapTime *NumberLaps
    TruRank Elapsed Time=GreenFlagElapsedTime+TimeonPitRoad
Luckiest and Unluckiest Drivers
    $\Delta$TruRank=ActualPosition–TruRank
    Luckiest drivers have $\Delta$TruRank < 0
    Unluckiest drivers have $\Delta$TruRank > 0
Collapse Points and Comeback Points
    • Collapse points and comeback points refer to a particular car in a particular race, and determines how much a particular car has improved from a particular position or gotten worse from a particular position
    CollapsePoints=max__(i∈laps) {max(ExpectedPosition[lap7≥i])–min (ExpectedPosition[lap≤i]") " }
    ComebackPoints=max__(i∈laps) {max(ExpectedPosition[lap≤i])–min (ExpectedPosition[lap≥i]") " }
Caution, Collapse, and Comeback Indices
    • Caution, Comeback, and Collapse indices apply to an entire race and characterize the degree to which cautions, comebacks, and collapse have played a role in the race
    • Caution Index
        - The Caution Index is an aggregated measure that indicates how much cautions affected the outcome of the race. A race with a "crazy finish" will tend to be characterized by a high Caution Index. It is calculated by
        - Calculating the standard deviation of the difference between actual finish position and TruRank Green Flag finish position. Call this this Caution Difference
        - Comparing that standard deviation to the 2011 to 2012 data and expressing it as a percentile like height and weight measurements. So, a race where the Caution Difference is 2 standard deviations above the average, the Caution Index would be in the 97th percentile.,
    • Comeback Index
        - The Comeback Index is an aggregated measure that indicates to what degree driver comebacks were a factor in -continued a given race. A higher Comeback Index indicates that more comebacks happened during the race than average, and tends to be associated with an unpredictable and exciting race. It is calculated by
- Summing the comeback points for all the drivers in the race
- Comparing that standard deviation to the 2011 to 2012 data and expressing it as a percentile like height and weight measurements. So, a race where the sum of driver comeback points is 2 standard deviations above the average, the Comeback Index would be in the 97th percentile.
• Collapse Index
- The Collapse Index is an aggregated measure that indicates to what degree driver collapses were a factor in a given race. A higher Collapse Index indicates that more collapses happened during the race than average, and tends to be associated with an unpredictable and exciting race. It is calculated by
- Summing the collapse points for all the drivers in the race
- Comparing that standard deviation to the 2011 to 2012 data and expressing it as a percentile like height and weight measurements. So, a race where the sum of driver collapse points is 2 standard deviations above the average, the Collapse Index would be in the 97th percentile.

Example 16

Turning to FIG. 11, there is shown a schematic of an embodiment of a distributed network configuration 1100. At the track 1110 there is Pi stream data 1111 (which can be timing and scoring ("T&S") information) that is transmitted to pit box processor 1114a for car #27, pit box processor 1114b for car #29, and pit box processor 1114c for car #31. Observer data from pit observers 1112, 1113 is transmitted 1117, 1116 to the local processors 1114a, 1114b, 1114c. The local processors, can among other things, share, compare and evaluate data, (which steps, processing and computation can occur to greater or lessor extents and can vary from track to track, and race team to race team); they further calculate and provide derived and predicted data, that is displayed on a GUI (or human machine interface, HMI) at the pit.

Pi stream data 1111, is also transmitted to a manufacture local processor 1115, e.g. GM, Ford, Toyota (teams, haulers, or other local, or intermediate processors may also be at the track, and receiving, sharing Pi and observed information, as well as, locally processed derived and predictive information). Information (actual, processed, derived, predictive) from the tack, e.g., local processors is transmitted 1120 to the cloud 1121, where additional servers 1122 for processing, network management etc. resided. A remote data center with observers, 1123, 1124 reviews real time, as well as potentially delayed information, in the form of video feed, e.g., a commercial broadcast of the race, and enter additional observed data, which is transmitted 1123a, 1124a to the servers 1122 for further processing. The servers review and process this data, and further and most preferably, use this data to update predicted, derived and actual information from the local processors 1120. The updated and further processed information is made available to the pit 1054 (as well as, additional pit information being sent to the servers 1122) an example of the communications stack 1053 is provided. The processor, 1150 has a stack 1053 running locally, and drives displays of information 1051, 1052 for presentation via GUI. Information from the server 1122 in the cloud may further be sent to other locations 1125, such as a shop 1114d, that provides displays 1126a, 1126b, but no processing or data input capabilities.

It is further understood that additional local processors may be used such as in a hauler, or that only a single master local processor may be used, for example in a race team hauler that locally processes Pi and observed data. Further, additional sources of observed data may be untilized.

The distributed network configuration of the embodiment in FIG. 11, may be in part, or in whole, integrated into the embodiment of FIG. 1. It could also be an entirely separate, e.g., private secure network, operating in parallel with the public network of FIG. 1. In this way a racing team, can have and control data and information in a secure manner. It is further understood that when operating such private and public networks, data, information and processing, can be shared at the processors 1122, to greater or lessor extents, while still maintaining the confidentiality of particular information, e.g., predicted pit stop for a competitor's car, for a private or secure network.

The master servers in the cloud further have the ability to update 1055, e.g., provide software updates, new software, new applications, to the local processors, as well as, the local data entry devices, e.g., smart phone, tablet, computer, or HMI.

Example 17

Pitt Data Entry Device (PDED) is a local device that can be used in the pit area, it has an HMI, a processor and a communications link. The PDED is preferably a mobile device that is in direct communications with a local server at the track. It may also provide information to a remover server, e.g., one in the cloud. For example a PDED can be a smart phone, a tablet, a scanner, an RFID reader, a voice transcription device (although this device may not be preferred in view of the ambient noise level at a race), a computer, a general purpose remote HMI, such as tools used for industry control, a specific device constructed for use in the pits, and combinations of these and other HMI devices. PDED devices may also have security, as well as GPS capabilities to provide meta data with the observed information to assist in the processors ability to determine the accuracy of the information. For example, if the PDED was located at pit position number 2, but was entering information for the car having pit position number 15 (which is out of sight of position 2) the server may check the meta data to confirm that the observer was within visual range of the pit position for which data was being reported. Other input, and information integrity tools may be utilized. As well as, data filtering and rejection algorithms, that may be employed at the local servers, the maters servers or both.

Example 18

Figure 12:
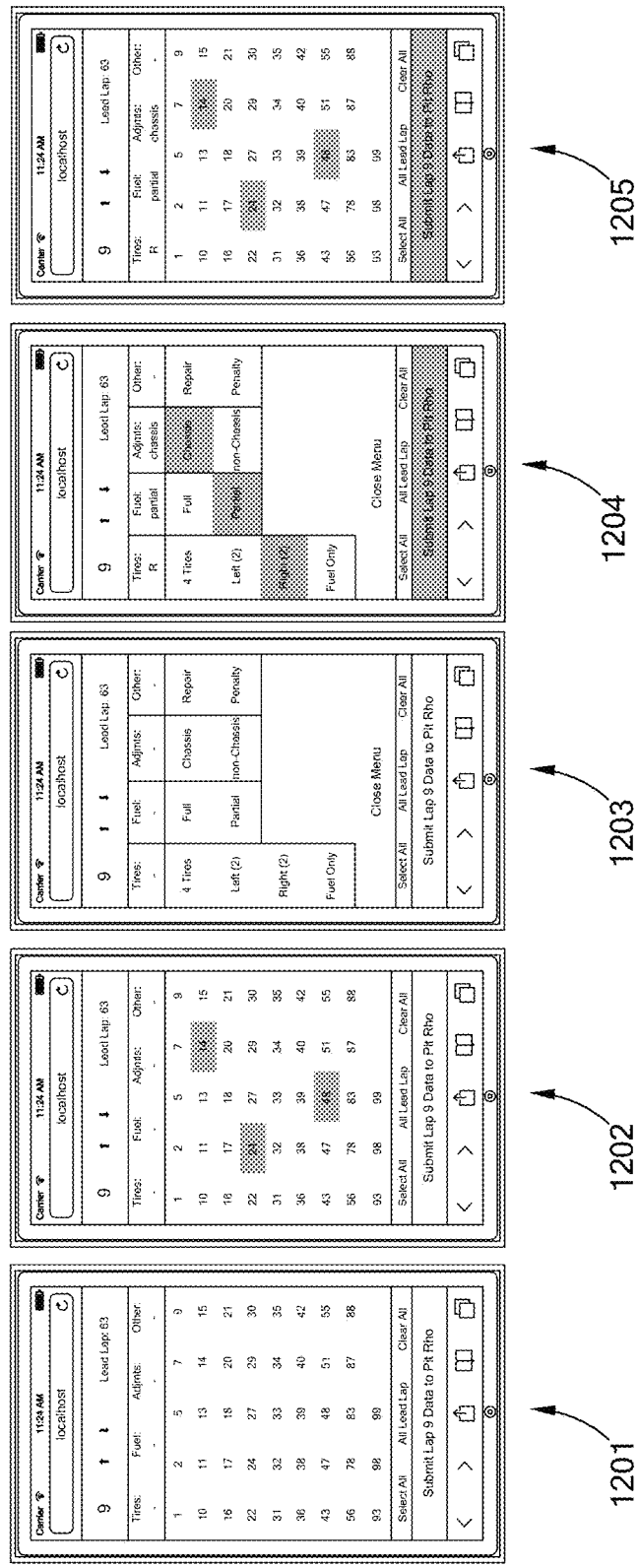
FIG. 12 is an embodiment of an input screen for a PDED in accordance with the present inventions.

Turning to FIG. 12 there is show an input screen for a PDED, as data is input, authenticated and sent to the local server, e.g., at a pit box. Thus, screen 1201 shows ready screen for the selection of predetermined data relating to particular information (e.g., tires, fuel, etc.), for a particular lap, e.g., 63 in the race, with no data being entered. Screen 1202 show that particular data has been selected, i.e., the grey fields. FIG. 1203 then shows a second window, which is based upon the selections of 1202, which provides for the input of further and more specific data, e.g., left (2) tires. Screens 1204, 1205 show that the data has been sent to the local server, as shown by the grey fields.

Example 19

Figure 13:
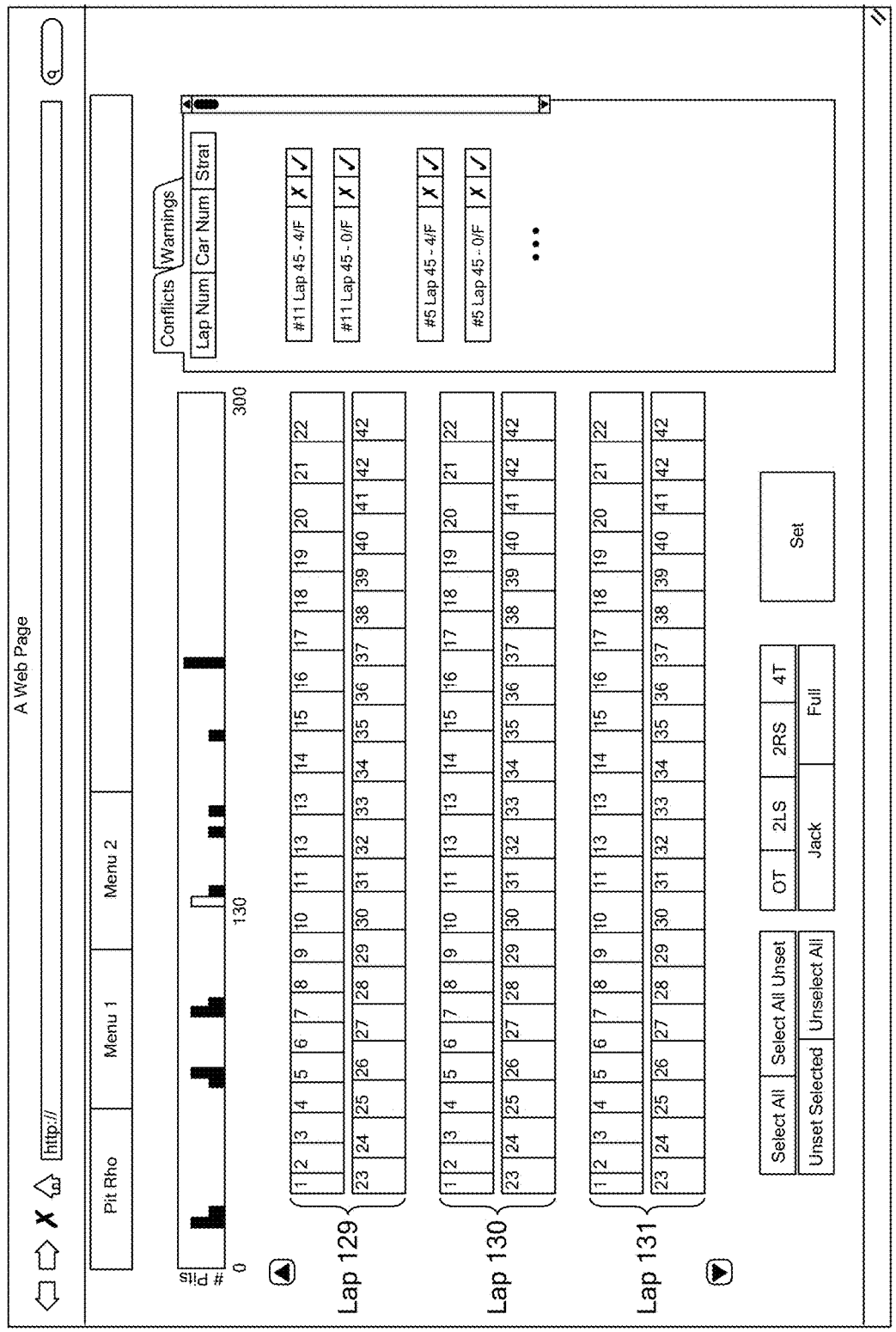
FIG. 13 is an embodiment of a screen for a PDAT in accordance with the present inventions.

Turning to FIG. 13 there is shown screen for a PDED that is also functioning as a pit data administration tool (PDAT).

The PDAT has an operator, who reviews the various, and potentially conflicting data received from the PDEDs. The local administrator can than follow a particular process for reconciling information, and assuring or enhancing the likelihood that only accurate data is forward to the server. The administrator has the ability to resolve conflicts, reject data, and add data based upon the administrators own observations. The function of the administrator may also be handled by the local servers, except for the ability to make observations and enter data. It should be noted that having an HMI, and data rendered in a form for approval or reconciliation, etc., prior to the first server, where such information is initially processed is desirable. This review and accept node in the system allows for experienced race personal to use their years of experience, and essential incorporate that experience and learning into the processing of the data.

Thus, it is preferable that each "instance," i.e., a local version of the processing software running locally, (e.g., a processor at the pits) has an administrator. This provides for greater accuracy of the initial data, and thus reduce errors that may be compounded or enlarged by later processing steps.

Example 20

Figure 14:
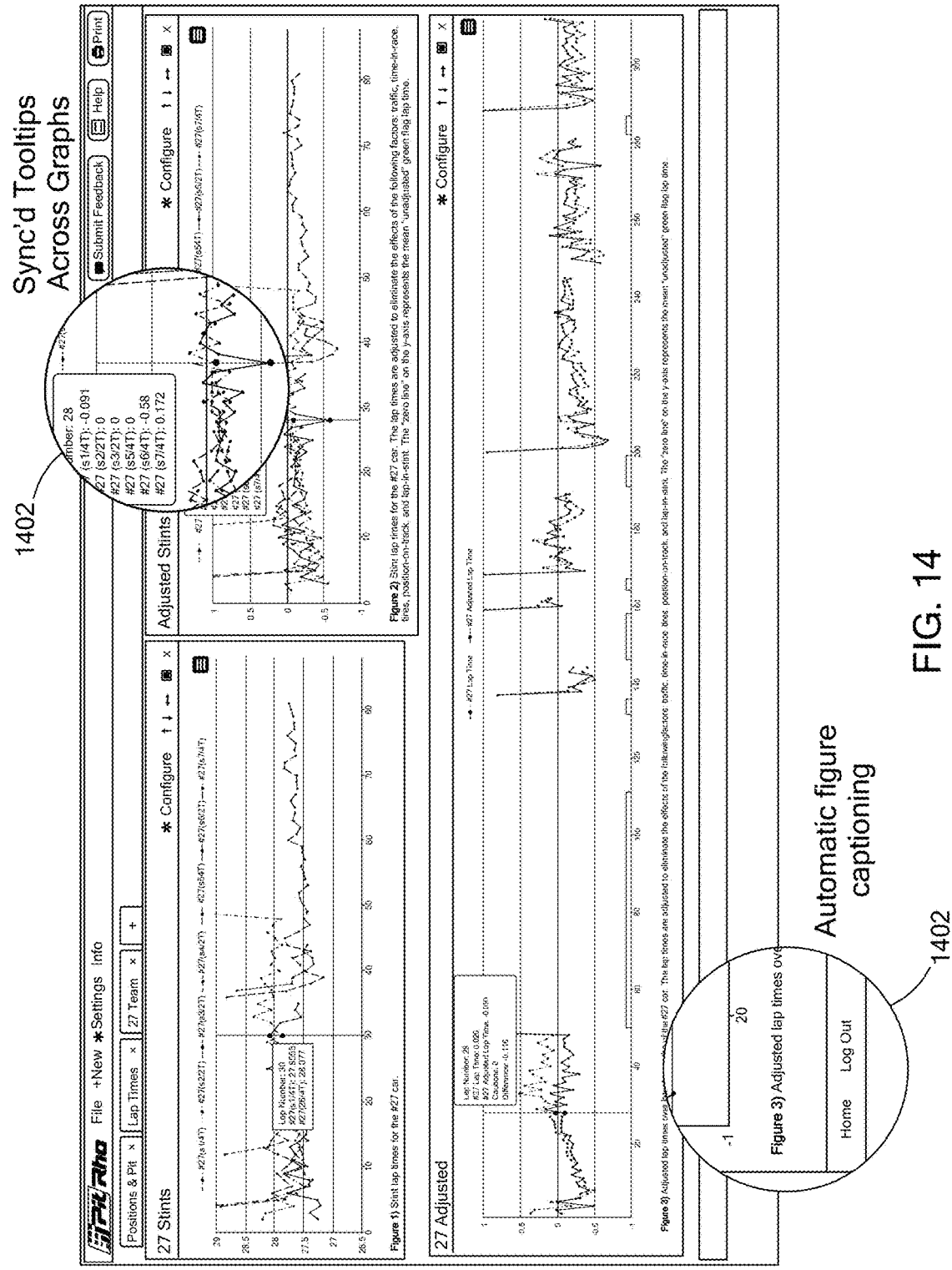
FIG. 14 is an embodiment of an HMI display for a syncing tool in accordance with the present inventions.

Turning to FIG. 14 there is shown an example of an HMI display for a syncing tool, application or feature. As shown in enlargement 1401, when a cursor, bar, or other indicator, is position over a particular point in the race, e.g., a lap, all other displays are automatically synced to, and display their respective information, for the selected point in time during the race. The HMI display further is automatically updated to display the captioning for each window, to reflect the selected time.

Example 21

Figure 15:
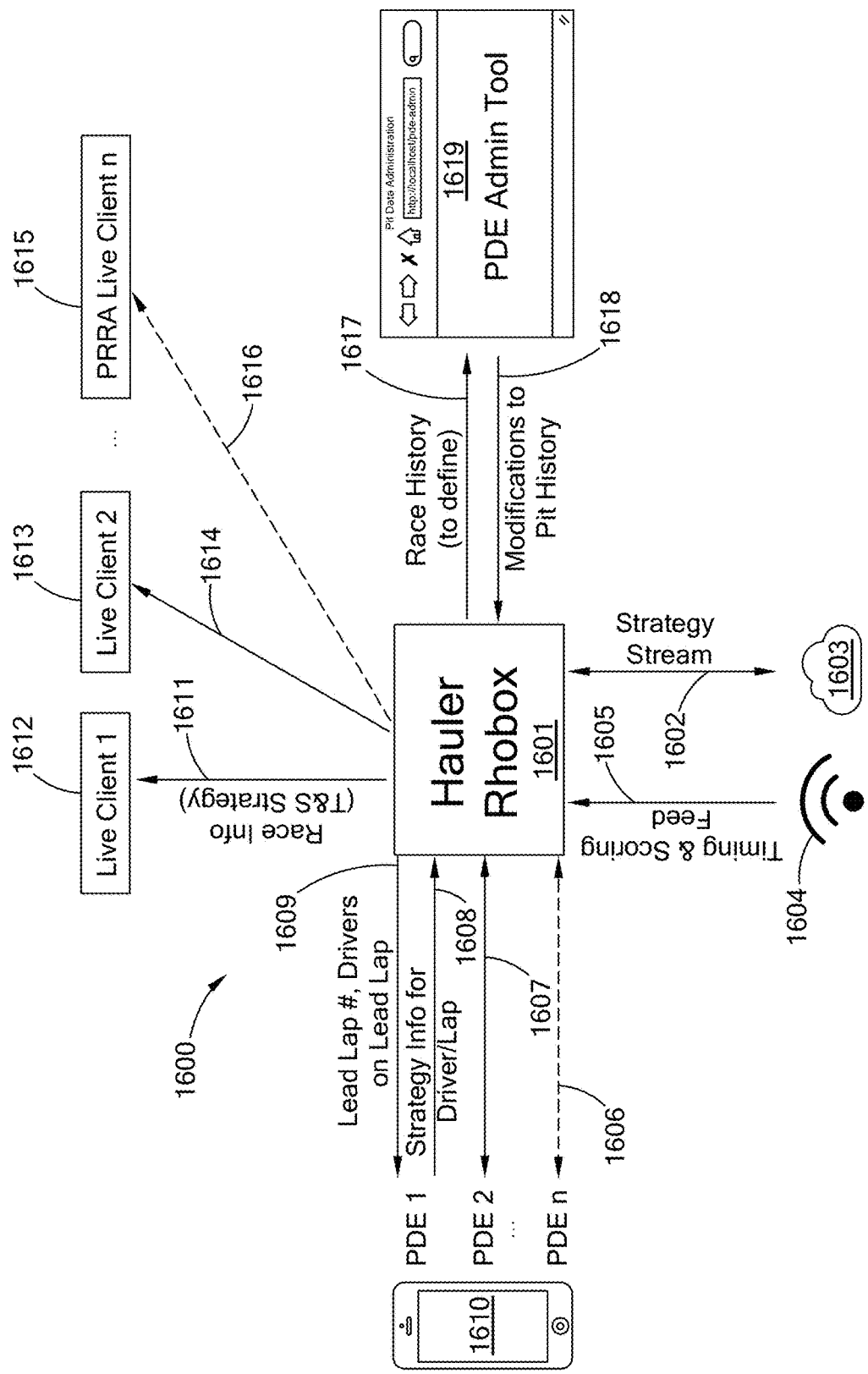
FIG. 15 is a schematic of an embodiment of a system in accordance with the present inventions.

Turning to FIG. 15 there is provided a schematic of an embodiment of a portion of a distributed network, which is based around the hauler 1601. Thus, PDED 1610, (as well as additional devices, e.g., PDE1, PDE1, to PDEn) send and receiver observed information from the race, 1606, 1607, 1608, 1609. The processor in the hauler 1601, communicates 1617, 1618 with a PDAD 1619 controlled by an administrator. The hauler 1601 further receives Pi data 1605, from the race track 1604. The hauler 1601 server then sends and receives information from servers in the cloud 1603. The hauler also has the ability to send actual, local derived, and local predictive information to other users, e.g., 1612, 1613, 1614 along communication paths 1611, 1614, 1616.

Example 22

Figure 16:
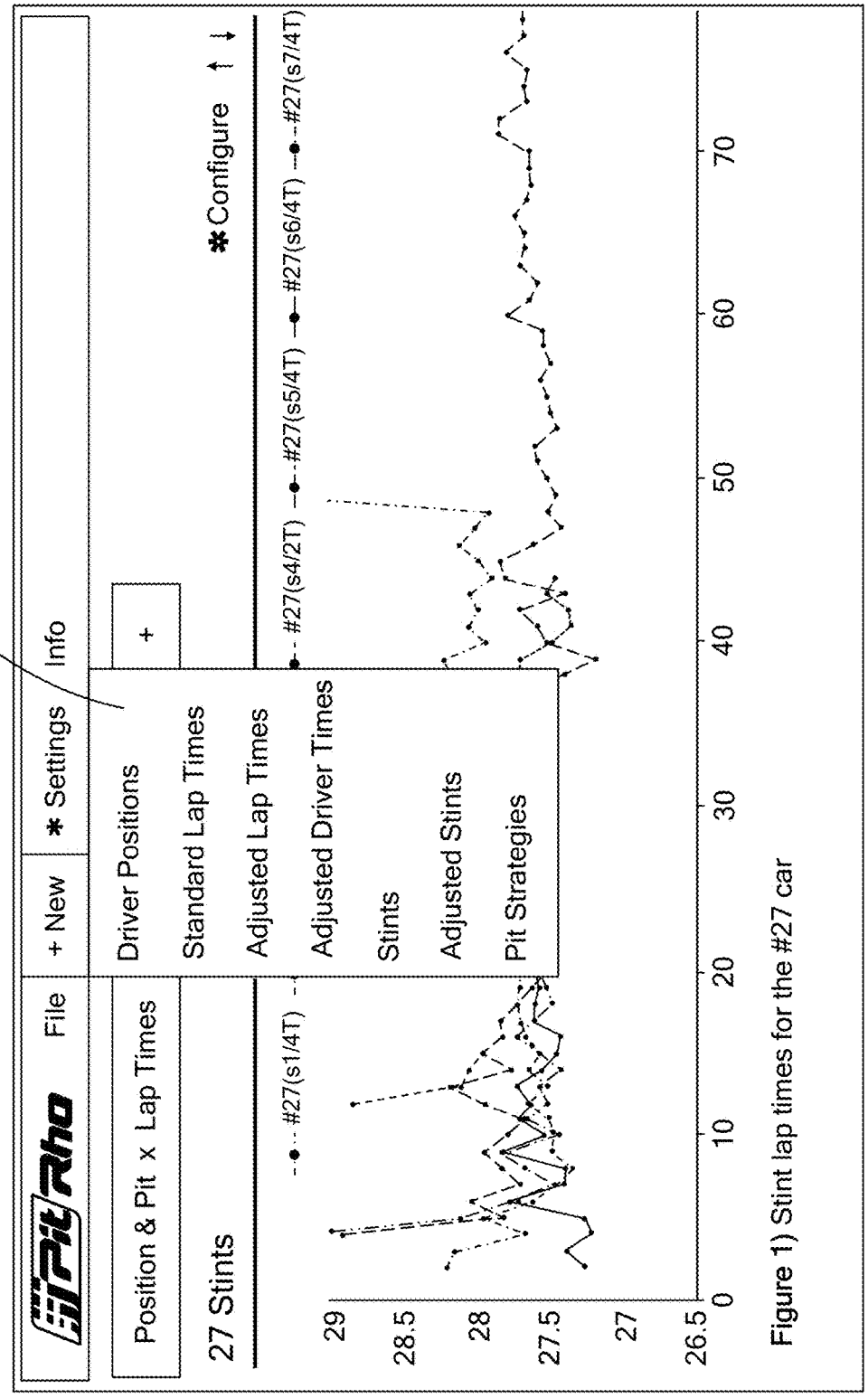
FIG. 16 is an embodiment of a GUI display in accordance with the present invention.

Turning to FIG. 16, there is shown a display for a GUI or HMI that has been customized for use in a pit box during the race. From the pull down menu, 1660 the various types of graphs and information that have been preselected and can be displayed are shown.

Example 23

A ghost rider is created by to processor. The ghost rider is an historic, actual or fictionalized, component of the multi-variable system. The ghost rider is based upon historic data to provide derived information regarding the performance of the ghost rider in a fictionalized or actual event. The derived information regarding the ghost rider is then utilized with actual, derived and predicted data from the fictionalize or actual event, to provide derived and predictive data, as well as ghost actual data to be used to provide predictive data for the event. In this manner the ghost rider behaves and effects the predicted outcome of the event as if it was an actual participant.

Example 23A

The ghost rider is a bus that is being run along a new route. The ghost rider bus route is run along with actual traffic data to provide predictive information about changes to the traffic flow.

Example 23B

The first ghost rider is an historic racer car and driver. The second ghost rider is an current race car drive. The processors have the ability to run a race between the two.

Example 23C

The first ghost rider of Example 23B is run in an actual race with the actual car and driver of the second ghost rider, and the other actual cars in an actual race. The system provides predictive and "ghost" actual data for the ghost rider as the race unfolds. (Noting that the ghost rider can not actual effect or win the race, other than in a fantasy play.) Further, the ghost riders car may be normalized to bring its performance within the restriction of other the actual cars.

Example 24

Actual, derived and predictive data, combined with video of a race are download and stored, for later viewing, by for example on demand, Net Flex®, Amazon® or other cable, broadcast, internet or content provider. The viewer has the ability to view the entire race with predictive and derive data being present. The viewer also has the ability to use the predictive data to jump forward in the race. Thus, the viewer has the ability to view the race and then based upon the predictive and derived data advance (e.g., fast forward, skip using for example the sync tool of Example 20) the race forward to view particular laps or times. In this manner, the viewer has the excitement of not knowing the actual outcome, e.g., the finishing order, but has the ability to skip to key or more exciting events. In essence, the stored video and derived and predictive data allows the viewer to in essence make their own high lights video of the race, and do so with out knowing, or spoiling the fun of seeing, the finish.

These various embodiments of networks, systems for providing and displaying data and information may be used in and with any multivariable system. The various embodiments of systems, methods and displays set forth in this specification may be used with other systems, methods and displays that may be developed in the future, or with existing systems, methods and displays, which may be modified in-part based on the teachings of this specification, to create other systems, methods and displays. These various embodiments of systems, methods and displays may also be used with other structures that may be developed in the future, or with existing structures, which may be modified in-part based on the teachings of this specification to provide for the utilization of systems, methods and displays as provided for in this specification. The structures, equipment, apparatus, displays and systems provided in the various figures and examples of this specification may be used with each other and the scope of protection afforded the present inventions should not be limited to a particular embodiment, configuration or arrangement that is set forth in a particular embodiment in a particular Figure or Example. Additionally, it is understood that the association of a particular drive to a particular, manufacture, racing team, sponsors or number is illustrative and not limiting; and that these associations can change over time.

Many other uses for the present inventions may be developed or realized and thus the scope of the present inventions is not limited to the foregoing examples of uses and applications. The present inventions may be embodied in other forms than those specifically disclosed herein without departing from their spirit or essential characteristics. The described embodiments are to be considered in all respects only as illustrative and not restrictive.

What is claimed:

1. A determinative system for obtaining, evaluating and displaying in a predictive manner, information and data regarding the activities of units in a multivariable component system, the determinative system comprising:
    a. a source of raw data regarding activities of a first plurality of units of a multivariable component system;
    b. a source of derived data regarding activities of a second plurality of units of the multivariable component system;
    c. wherein, at least one unit of the first plurality of units is the same as a unit of the second plurality of units, and wherein at least one of the first plurality of units is different from a unit of the second plurality of units;
    d. a processor in communication with the source of derived data and the source of raw data, the processor capable of performing a weighted multi-approach system;
    e. the processor capable of performing a first predictive computation to determine a change of state event in the multivariable component system from the raw data and the derived data; and,
    f. whereby the processor determines predictive information comprising a probability for the change of state event, and wherein the processer communicates the predictive information to a display.

2. The system of claim 1, wherein the multivariable component system comprises a NASCAR sanctioned event; and wherein the system comprises a means for reducing a latency period.

3. The system of claim 2, wherein at least one unit of the first plurality of units is a race car driven by at least one of the drivers selected from the group consisting of Jimmie Johnson, Dale Earnhardt Jr., Mark Martin, Brad Keselowski, Ryan Newman, Greg Biffle, Danica Patrick, Michael McDowell, Jeff Gordon, and Paul Menard.

4. The system of claim 1, wherein the processor is capable of performing a second predictive computation to determine the change of state event in the multivariable component system from the raw data and the derived data; whereby the processor determines predictive information comprising a probability for the change of state event based in part on the first and second predictive computation, and wherein, the processer transmits the predictive information to a display.

5. The system of claim 1, wherein at least 5 of the units in the first plurality units are the same as the units in the second plurality of units.

6. The system of claim 1, wherein the display is a Second Screen.

7. The system of system claim 1, wherein the display is a commercial media broadcast.

8. The system of claim 1, where wherein the display is a hand held device.

9. The system of claim 1, wherein the display has an imagine comprising an image of a race car with the predictive information displayed in association with the race care image.

10. The system of claim 1, wherein the display has an imagine comprising a image of a race car with the predictive information displayed in association with the race care image, wherein the predictive information is displayed in a Second Screen.

11. The system of claim 2, wherein the processor is capable of performing a second predictive computation to determine the change of state event in the multivariable component system from the raw data and the derived data; whereby the processor determines predictive information comprising a probability for the change of state event based in part on the first and second predictive computation, and wherein, the processer transmits the predictive information to a display.

12. The system of claim 2, wherein at least 5 of the units in the first plurality units are the same as the units in the second plurality of units.

13. The system of claim 2, wherein the display is a Second Screen.

14. The system of system claim 2, wherein the display is a commercial media broadcast.

15. The system of claim 2, where wherein the display is a hand held device.

16. The system of claim 2, wherein the display has an imagine comprising an image of a race car with the predictive information displayed in association with the race care image.

17. The system of claim 2, wherein the display has an imagine comprising an image of a race car with the predictive information displayed in association with the race care image, wherein the predictive information is displayed in a Second Screen.

18. The system of claim 4, wherein at laser 5 of the units in the first plurality units are the same as the units in the second plurality of units.

19. The system of claim 4, wherein the display is a Second Screen.

20. The system of system claim 4, wherein the display is a commercial media broadcast.

21. The system of claim 4, where wherein the display is a hand held device.

22. The system of claim 4, wherein the display has an imagine comprising an image of a race car with the predictive information displayed in association with the race care image.

23. The system of claim 4, wherein the display has an imagine comprising an image of a race car with the predictive information displayed in association with the race care image, wherein the predictive information is displayed in a Second Screen.

24. The system of claim 1, wherein the multivariable component system comprises a Formula 1 event.

25. The system of claim 1, wherein the multivariable component system comprises an Indy Car event.

26. The system of claim 1, wherein the multivariable component system comprises a motorized vehicle race.

27. The system of claim 1, wherein the multivariable component system comprises a race.

28. The system of claim 1, wherein the multivariable component system comprises a stock car race.

29. The system of claim 1, comprising a second processors and a local data entry device for providing observed data, wherein the second processor is in communication with the local data entry device and in communication with the processor, whereby the second processor is capable of performing a first predictive computation to determine a change of state event in the multivariable component system from the observed data; and, the second processor is capable of determining predictive information comprising a probability for the change of state event, and wherein the processer communicates the predictive information to a device, selected from the group consisting of the server, a GUI, the processor, a third processor, a pit administration device, and an HMI.

30. The system of claim 29, comprising a pit data administration device located between the pit data entry device and the second server, whereby the pit data administration device is capable of controlling the transmission of observed data to the second processor.

31. The system of claim 29, comprising a communication link to the second server providing to the second processor a timing and scoring feed data; whereby the second processor is capable of performing a first predictive computation to determine a change of state event in the multivariable component system from the observed data and the timing and scoring data.

32. The system of claim 4, comprising a second processors and a local data entry device for providing observed data, wherein the second processor is in communication with the local data entry device and in communication with the processor, whereby the second processor is capable of performing a first predictive computation to determine a change of state event in the multivariable component system from the observed data; and, the second processor is capable of determining predictive information comprising a probability for the change of state event, and wherein the processer communicates the predictive information to a device, selected from the group consisting of the server, a GUI, the processor, a third processor, a pit administration device, and an HMI.

33. The system of claim 32, comprising a pit data administration device located between the pit data entry device and the second server, whereby the pit data administration device is capable of controlling the transmission of observed data to the second processor.

34. The system of claim 32, comprising a communication link to the second server providing to the second processor a timing and scoring feed data; whereby the second processor is capable of performing a first predictive computation to determine a change of state event in the multivariable component system from the observed data and the timing and scoring data.

35. The system of claim 28, comprising a second processors and a local data entry device for providing observed data, wherein the second processor is in communication with the local data entry device and in communication with the processor, whereby the second processor is capable of performing a first predictive computation to determine a change of state event in the multivariable component system from the observed data; and, the second processor is capable of determining predictive information comprising a probability for the change of state event, and wherein the processer communicates the predictive information to a device, selected from the group consisting of the server, a GUI, the processor, a third processor, a pit administration device, and an HMI.

36. The system of claim 35, comprising a pit data administration device located between the pit data entry device and the second server, whereby the pit data administration device is capable of controlling the transmission of observed data to the second processor.

37. The system of claim 35, comprising a communication link to the second server providing to the second processor a timing and scoring feed data; whereby the second processor is capable of performing a first predictive computation to determine a change of state event in the multivariable component system from the observed data and the timing and scoring data.

38. A determinative system for obtaining, evaluating and displaying in a predictive manner, information and data regarding the activities of units in a virtual multivariable component system, the determinative system comprising:
   a. a source of virtual raw data regarding activities of a first plurality of units of a multivariable component system;
   b. a source of virtual derived data regarding activities of a second plurality of units of the multivariable component system;
   c. wherein, at least one unit of the first plurality of units is the same as a unit of the second plurality of units, and wherein at lease one of the first plurality of units is different from a unit of the second plurality of units;
   d. a processor in communication with the source of virtual derived data and the source of virtual raw data, the processor capable of performing a weighted multi-approach system;
   e. the processor capable of performing a first predictive computation to determine a change of state event in the virtual multivariable component system from the virtual raw data and the virtual derived data; and,
   f. whereby the processor determines predictive information comprising a probability for the change of state event, and wherein the processer communicates the predictive information to a display.

39. The system of claim 38, wherein the processor is capable of performing a second predictive computation to determine the change of state event in the multivariable component system from the raw data and the derived data; whereby the processor determines predictive information comprising a probability for the change of state event based in part on the first and second predictive computation, and wherein, the processer transmits the predictive information to a display.

40. The system of claim 38, wherein at least 5 of the units in the first plurality of units are the same as the units in the second plurality of units.

41. The system of claim 38, wherein the display is a Second Screen.

42. The system of system claim 38, wherein the display is a commercial media broadcast.

43. The system of claim 38, where wherein the display is a hand held device.

44. The system of claim 38, wherein the display has an imagine comprising an image of a race car with the predictive information displayed in association with the race care image.

45. The system of claim 38, wherein the display has an imagine comprising an image of a race car with the predictive information displayed in association with the race care image, wherein the predictive information is displayed in a Second Screen.

46. A method of providing a display of a race to a viewer, the method comprising:
  a. providing actual race data from a race having a first plurality of motor cars and a second plurality of motor cars, wherein at least of the first plurality is the same as one of the second plurality and one of the first plurality is different from one of the second plurality and historic race data to a network, the network defining a plurality of communication pathways;
  b. obtaining the actual race data from a plurality of sources of a plurality of raw data types regarding activities of both the first plurality of motor cars and the second plurality of motor cars, the sources of actual data and actual data types selected from the group consisting of transponders, speed transponders, location transponders, direction transponders, optical switches, magnetic sensors, motor temperature, speed, motor rpm, fuel, fuel flow rate, oil pressure, brake pressure, chassis performance, and driver biometrics;
  c. providing the raw data along at least one of the network pathways and providing the historic data along at least one of the network paths to a derived data source; the derived data source providing derived data to a processor; the processor performing a weighted multi-approach to provide predictive race data;
  d. transmitting the predictive race data along at least one of the network pathways; transmitting the raw race data along at least one of the network pathways; and transmitting the derived race data along at least one of the network pathways;
  e. a first device on a first one of the network pathways receiving first predictive race data, derived race data and actual race data; a second device on a second one of the network pathways receiving second predictive race data, derived race data and actual data, wherein at least one of the first predictive race data, derived race data and actual race data is different from the second predictive race data, derived race data and actual race data; and a third device on a third one of the network pathways receiving third predictive race data, derived race data and actual data, wherein at least one of the third predictive race data, derived race data and actual race data is different from the second and the first predictive race data, derived race data and actual race data; wherein the third device is located in a pit area for one of the motor cars; and,
  f. the devices displaying at least one of the received predictive race data, derived race data and actual race data in a GUI.

47. The method of claim 46, wherein the race is a stock car race, and wherein the derived data source is selected from the group consisting of support vector machines, normalized lap time, adjusted lap time, unit position relative to lap time, unit position relative to a caution sequence, and unit position relative to different unit tire change sequence.

48. The method of claim 46, wherein the race is a formula 1 race, and wherein the derived data source is selected from the group consisting of support vector machines, normalized lap time, adjusted lap time, unit position relative to lap time, unit position relative to a caution sequence, and unit position relative to different unit tire change sequence.

49. The method of claim 47, wherein at least one of the first, second or third devices displays the predictive data in preconfigured windows on the GUI, the windows being menu driven to provide predetermined displays of the predictive data.

50. The method of claim 47, wherein at least one of the first, second or third devices displays, predictive data, derived data and actual data, in preconfigured windows on the GUI, the windows being menu driven to provide predetermined displays of the data.

51. The method of claim 47, comprising a data processing assembly, residing in the cloud, whereby the data processing assembly performs the processing of the actual and historic data.

52. The method of claim 47, comprising a fourth device on a fourth one of the network pathways receiving fourth predictive race data, derived race data and actual data, wherein at least one of the fourth predictive race data, derived race data and actual race data is different from the third predictive race data, derived race data and actual race data; wherein the fourth device is located in a nit area for one of the motor cars.

53. The method of claim 47, wherein the network is a distributed net work comprising a plurality of data processing assemblies, each receiving actual data and providing to the network derived and predictive data.

54. The method of claim 47, wherein the GUI displays images of the race.

55. The method of claim 49, wherein the GUI displays images of the race.

56. A method of combining information about a race for later viewing, the method comprising: storing data containing a video image of the race; associating in a time synchronized manner with the video image actual, predictive and derived data; storing the associated video and data; and making the associated video and data available for viewing; and wherein the actual data is obtained from the group consisting of transponders, speed transponders, location transponders, direction transponders, optical switches, magnetic sensors, motor temperature, unit speed, unit motor rpm, unit fuel, unit fuel flow rate, unit oil pressure, unit brake pressure, unit chassis performance, and driver biometrics; wherein the derived data is obtained from a derived data source selected from the group consisting of support vector machines, normalized lad time, adjusted lap time, unit position relative to lad time, unit position relative to a caution sequence, and unit position relative to different unit tire change sequence; and wherein the predictive data is obtained from a weighted multi-approach.

57. A method of viewing a race, the method comprising: accessing data comprising a video image of the race associated in a time synchronized manner with actual, predictive and derived data; viewing the video of the race and at least the predictive data; having the capability to skip forward in the viewing of the race, based at least in part upon the predictive data, whereby the viewer has the ability to create and view high lights of the race without knowing the actual outcome of the race; and wherein the actual data is obtained from the group consisting of transponders, speed transponders, location transponders, direction transponders, optical switches, magnetic sensors, motor temperature, unit speed, unit motor rpm, unit fuel, unit fuel flow rate, unit oil pressure, unit brake pressure, unit chassis performance, and driver biometrics; wherein the derived data is obtained from a derived data source selected from the group consisting of support vector machines, normalized lap time, adjusted lap time, unit position relative to lap time, unit position relative to a caution sequence, and unit position relative to different unit tire change sequence; and wherein the predictive data is obtained from a weighted multi-approach.

58. A determinative system for obtaining, evaluating and displaying in a predictive manner, information and data regarding the activities of units in a multivariable component auto racing system, the determinative system comprising:

a. a communication network having a plurality of communications pathways;

b. a plurality of sources of a plurality of raw data types regarding activities of a first plurality of units of a multivariable component system, the sources of raw data and raw data types selected from the group consisting of transponders, speed transponders, location transponders, direction transponders, optical switches, magnetic sensors, motor temperature, unit speed, unit motor rpm, unit fuel, unit fuel flow rate, unit oil pressure, unit brake pressure, unit chassis performance, and driver biometrics;

c. a source of derived data regarding activities of a second plurality of units of the multivariable component system the source of derived data selected from the group consisting of support vector machines, normalized lap time, adjusted lap time, a unit position relative to lap time, a unit position relative to yellow flag sequence, and a unit position relative to different unit tire change sequence;

d. wherein, at least one unit of the first plurality of units is the same as a unit of the second plurality of units, and wherein at least one of the first plurality of units is different from a unit of the second plurality of units;

e. a processor in communication with the source of derived data and the source of raw data, the processor capable of performing a weighted multi-approach system;

f. the processor capable of performing a first predictive computation to determine a change of state event in the multivariable component system from the raw data and the derived data; and, g. whereby the processor determines predictive information comprising a probability for the change of state event, and wherein the processer communicates the predictive information to a display.

59. The system of claim 58, wherein the communications pathway are selected from the group consisting of a pit communication pathway; a fan pathway, a premium pathway; a mastercenter pathway, a pit pathway; and a commercial network pathway.

60. The system of claim 59, wherein each unit has its own path way pit path way.

* * * * *